United States Patent
Rassamni et al.

(10) Patent No.: US 12,430,005 B2
(45) Date of Patent: Sep. 30, 2025

(54) USER INTERFACES USING GRAPHICAL UNITS AND INTERSECTIONS

(71) Applicant: Pulse-iQ, Inc., Allen, TX (US)

(72) Inventors: Jerry Rassamni, Allen, TX (US); Nathaniel James Rassamni, Dallas, TX (US)

(*) Notice: Subject to any disclaimer, the term of this patent is extended or adjusted under 35 U.S.C. 154(b) by 0 days.

(21) Appl. No.: 18/313,369

(22) Filed: May 7, 2023

(65) Prior Publication Data
US 2023/0273710 A1    Aug. 31, 2023

Related U.S. Application Data

(63) Continuation-in-part of application No. 17/399,095, filed on Aug. 11, 2021, now abandoned.

(60) Provisional application No. 63/064,732, filed on Aug. 12, 2020.

(51) Int. Cl.
*G06F 3/048* (2013.01)
*G06F 3/0483* (2013.01)
*G06F 3/04847* (2022.01)
*G06F 9/451* (2018.01)
*G06Q 10/0639* (2023.01)

(52) U.S. Cl.
CPC ........ *G06F 3/0483* (2013.01); *G06F 3/04847* (2013.01); *G06F 9/451* (2018.02); *G06Q 10/06393* (2013.01)

(58) Field of Classification Search
CPC .... G06F 3/0483; G06F 3/04847; G06F 9/451; G06F 3/0481; G06F 3/0482; G06Q 10/06393
See application file for complete search history.

(56) References Cited

U.S. PATENT DOCUMENTS

| 10,725,616 | B1* | 7/2020 | Porath | G06F 16/9038 |
| 2005/0052474 | A1* | 3/2005 | Cardno | G06F 16/904 |
| | | | | 707/E17.142 |
| 2012/0162265 | A1* | 6/2012 | Heinrich | G06F 3/04883 |
| | | | | 345/173 |

(Continued)

FOREIGN PATENT DOCUMENTS

WO    WO-2018158773 A1 *  9/2018    ......... A63B 24/0021

OTHER PUBLICATIONS

May 13, 2022 USPTO Office Action (U.S. Appl. No. 17/399,095).
Nov. 7, 2022 USPTO Office Action (U.S. Appl. No. 17/399,095).

*Primary Examiner* — Rashawn N Tillery
(74) *Attorney, Agent, or Firm* — Forsgren Fisher; Daniel A. Tysver; James M. Orzedowski

(57) ABSTRACT

The present disclosure uses statistical analysis and an artificial intelligence (AI) algorithm to help identify a plurality of targets for emphasis. An emphasis is a real-world activity that is designed to lead to a desired behavior by a target. A user interface is presented that allows for a selection of targets in a manner that improves the health of weak strategies and indicators as predicted by the AI algorithm instead of focusing on a single overall metric for all targets being analyzed. A separate user interface provides at least two arcs that are each associated with separate types of statistical analysis (or indicators), where intersecting lines are associated with a subset of targets. At the intersections are graphical units that are color coded based on the trend of those indicators over time.

23 Claims, 22 Drawing Sheets

(56) References Cited

U.S. PATENT DOCUMENTS

| | | | |
|---|---|---|---|
| 2014/0379437 A1* | 12/2014 | Singh | G06Q 10/06393 |
| | | | 705/7.39 |
| 2015/0040052 A1* | 2/2015 | Noel | G06F 3/04847 |
| | | | 715/771 |
| 2016/0174099 A1* | 6/2016 | Goldfain | A61B 5/6831 |
| | | | 375/130 |
| 2016/0216875 A1* | 7/2016 | Soo | H02J 3/00 |
| 2016/0292611 A1* | 10/2016 | Boe | G06Q 10/06393 |
| 2017/0017903 A1 | 1/2017 | Gray | |
| 2019/0097909 A1* | 3/2019 | Puri | G06F 16/951 |
| 2019/0243836 A1 | 8/2019 | Nanda | |
| 2021/0042643 A1 | 2/2021 | Hong | |
| 2021/0065048 A1* | 3/2021 | Salonidis | G06F 9/542 |
| 2021/0092156 A1* | 3/2021 | Sharif | H04L 63/20 |
| 2021/0150546 A1 | 5/2021 | Zhu | |
| 2021/0327109 A1* | 10/2021 | Barosi | G06Q 10/067 |
| 2022/0114526 A1* | 4/2022 | Shi | G06F 3/0482 |

* cited by examiner

Fig. 6

| Strategy (400) | Segments (620) | Trend for Specific KPI (630) | Score (640) | Predictive Prescription (Task) (650) |
|---|---|---|---|---|
| Acquisition (Non-Donors) | Non-Donors | Variation over Prior Date(s) | Average | Acquire new |
| Reactivation (Lapsed) | Lapsed Major | Variation over Prior Date(s) | Poor | Fix by ... |
| | Lapsed Multi | Variation over Prior Date(s) | Average | Fix by ... |
| | Lapsed Potential Major | Variation over Prior Date(s) | Poor | Fix by ... |
| | Lapsed Regular | Variation over Prior Date(s) | Average | Fix by ... |
| | Lapsed Single | Variation over Prior Date(s) | Poor | Fix by ... |
| Conversion (Single) | Single Potential Major | Variation over Prior Date(s) | Poor | Fix by ... |
| | Single Potential Multi | Variation over Prior Date(s) | Average | Fix by ... |
| Retention (Lapsing) | Lapsing Major | Variation over Prior Date(s) | Average | Fix by ... |
| | Lapsing Multi | Variation over Prior Date(s) | Good | |
| | Lapsing Regular | Variation over Prior Date(s) | Poor | Fix by ... |
| Cultivation (Active) | Major | Variation over Prior Date(s) | Average | Fix by ... |
| | Multi | Variation over Prior Date(s) | Average | Fix by ... |
| | Regular | Variation over Prior Date(s) | Good | |

Tabs (610): Segments | Seasonality | Selection

600

USER INTERFACES USING GRAPHICAL UNITS AND INTERSECTIONS

CROSS-REFERENCE TO RELATED CASES

This application is a continuation-in-Part of U.S. patent application Ser. No. 17/399,095, filed on Aug. 11, 2021, which in turn claimed the benefit of U.S. Provisional Application Ser. No. 63/064,732, filed on Aug. 12, 2020, both of which are hereby incorporated by reference in their entireties.

TECHNICAL FIELD

The described embodiment relates to an improved user interface designed to present coded graphical units grouped according to subsets of data and common mathematical analyses of that data.

BACKGROUND

Software programs interact with users through graphical user interfaces. These interfaces serve multiple purposes, including to receive instructions from users, to present information to the users, and to allow for a modification of the way in which data is selected and presented. One common issue with user interfaces that is that they frequently need to present a large amount of data to a user without overwhelming the user.

Software programs that present business related data are not immune from this issue. For example, enterprises frequently use of software tools to monitor business performance and find opportunities for development. These software programs commonly use statistical analysis to identify key performance indicators (KPIs), which are mathematical values or groups of values that indicate a business's purpose or aspect. Existing software user interfaces that show KPIs frequently overwhelm users with too many options and variables, resulting in confusing and chaotic interfaces. At the same time, it is difficult to display all of the KPIs that are most important to the industry. These user interfaces are complex and disorganized, and there is no efficient mechanism to link these interfaces to any intelligent analysis of their situation.

BRIEF DESCRIPTION OF THE DRAWINGS

FIG. 6 shows a user interface showing segments of strategies and assigned scores.

DETAILED DESCRIPTION

Figure 1:
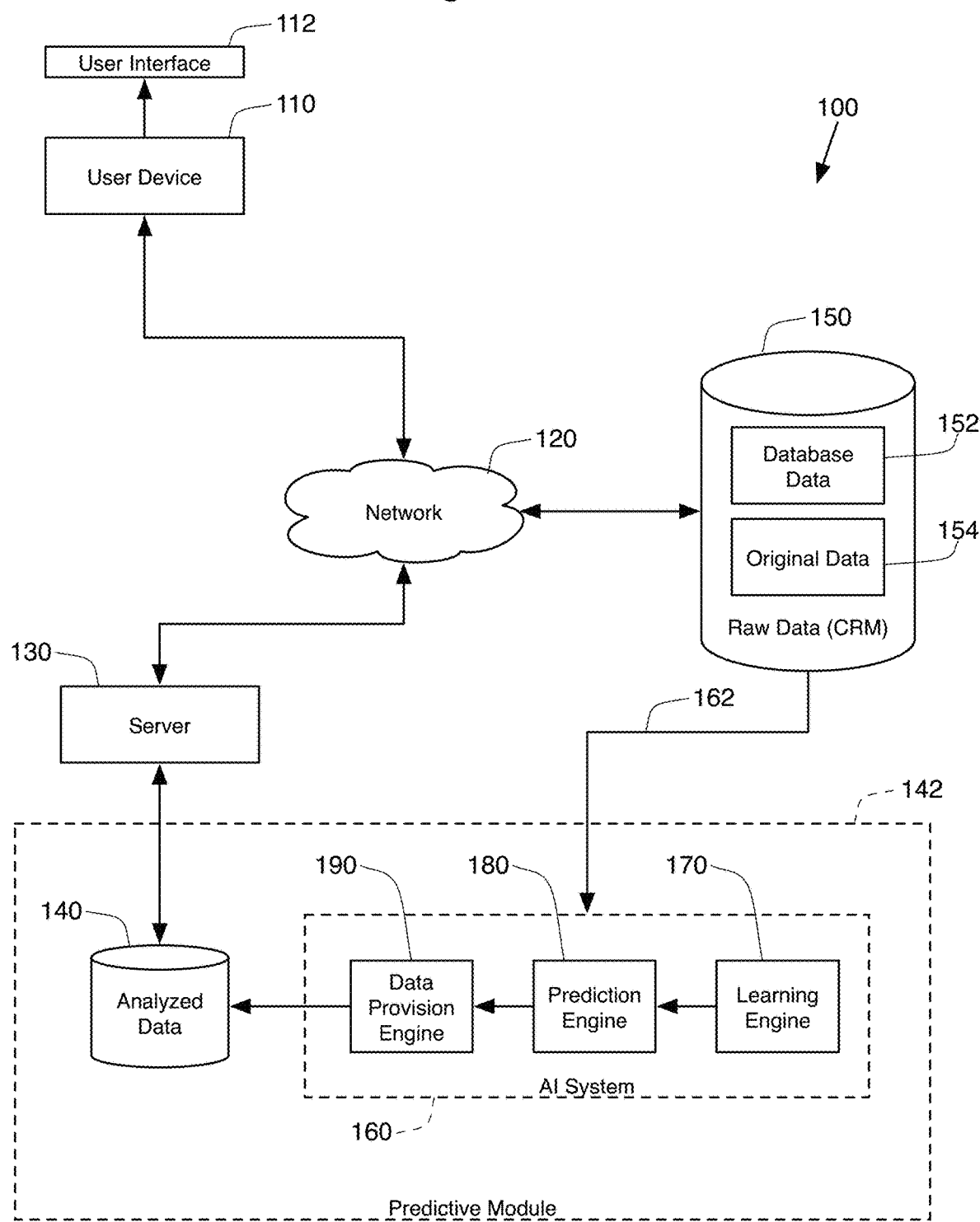
FIG. 1 is a schematic view of a system for implementing a described embodiment.

Introduction to Targets and Target Data, Strategies, KPIs, and Emphasis

This disclosure introduces a system that leverages statistical analysis and artificial intelligence (AI) algorithms to identify and prioritize a plurality of targets for emphasis. The AI algorithms operate at a data level, and targets are associated with target data stored in a data store. The target data includes multiple target data elements, with each target data element corresponding to a real-world target. As such, the AI algorithms identify a plurality of target data elements for emphasis. For simplicity, this disclosure will often refer to these "target data elements" as simply "targets." The target data elements are associated with associated data, which may include attribute data and transaction data. The phrase "associated with" can mean, for example, a relationship in a relational database, or a simple attribute field on a table that defines the target data elements.

The system presents a user interface that allows manual selection of targets based on the statistical and AI analysis. The targets can take various forms, including data elements that identify individual humans and organizations.

The targets are assigned to one or more strategies based on attributes associated with the targets. Strategies define different portions of a life cycle associated with the targets. Targets move between different strategies in the life cycle over time, and such movement is expected in a properly defined life cycle and is important for determining an overall health for a group of targets.

Each strategy can be classified as good (or "healthy" or "strong"), bad (or "unhealthy" or "weak"), or neutral based on a statistical analysis of attributes associated with the targets within the strategy. The analysis can result in the creation of key performance indicators (KPIs) that reflect some statistical summary of one or more attributes of the targets. These KPIs can change over time, either toward the good or toward the bad.

Each strategy is generally associated with a subset of primary KPIs, which can be selected based on human analysis or analysis by AI algorithms. Artificial intelligence algorithms can identify particular KPIs for a strategy that show correlation or causation with healthy and unhealthy movements of targets between strategies. These KPIs can then be selected as a primary KPI for the strategy. Mathematical trends in the primary KPIs for a strategy can be used to define a health score for that strategy.

Emphasis can be placed on particular targets in an attempt to change their future attributes and, as a result, improve the primary KPIs for a strategy or for the collection of targets as a whole. An emphasis is a real-world activity that is designed to lead to a desired behavior by a target. Emphasis can take a variety of forms. In the context of fund-raising for non-profits, the targets can be contributing individuals and foundations, and the emphasis can be the sending of marketing messages to the targets. Such emphasis is likely to encourage a new gift, or to encourage more frequent giving, or to encourage a larger gift. The KPIs that are to be improved may therefore relate to the frequency, recency, or amount of giving. In the context of employees in an enterprise, and the health of individual targets may relate to work satisfaction, performance evaluations, and longevity of employment. The emphasis that can be made toward particular targets in this context can be the payment of cash bonuses, salary increases, increased employee benefits, specialized training, remote working opportunities, increased travel opportunities, etc. In a for-profit context, the targets might be existing and potential customers. One purpose for the AI algorithm is to predict for the different targets how they will respond to be subjected to this type of emphasis.

Regardless of the context, the emphasis to be placed on target requires the expenditure of resources. While the application of all types of emphasis on all targets would no doubt increase the health of targets, improve KPIs, and strengthen strategies, most organizations cannot afford such a universal expenditure. Instead, particular targets must be chosen for emphasis. In the context of fund-raising, selected targets can be chosen for more expensive, more effective marketing. Employees may be chosen for the receipt of bonuses or specialized training.

The present disclosure relates to the above analysis and the provision of a user interface that leverages such analysis for the selection of targets by a user. The user interface allows the user to select targets in a manner that improves the health of weak strategies and KPIs instead of focusing on a single overall metric for all targets being analyzed.

System 100

FIG. 1 shows a system 100 for generating improved user interfaces for the presentation target data and the selection of target data for emphasis. The system 100 contains a user device 110 that presents a computerized user interface 112 to a user. The user device 110 is configured to access a server 130 over a computer network 120. In one embodiment, the server 130 provides most aspects of the user interface 112 to the user device 110 as a software-as-a-service (SAAS). In other embodiments, the user interface 112 is generated using local programming on the user device 110, with data for that interface being provided by the server 130.

The user device 110 and the server 130 are both computing devices utilizing a programmed processor to perform automated processes. As such, these computing devices 110, 130 both contain a computer processor and data storage or memory (collectively referred to herein as memory), including short term memory such as RAM and long-term memory such as flash storage. Programming instructions for the processor are stored in and retrieved from the memory, and data acquired and created by the processor is also stored in and retrieved from the memory. These computing devices 110, 130 can be a standard computer, such as a desktop computer, a laptop computer, or a server system. Alternatively, they may comprise mobile devices, including smart phones or tablet computers.

System 100 also contains two locations for data, namely analyzed data 140 and raw data 150. Raw data 150 is shown connected directly to the computer network 120 and is accessed by the server 130 over this network 120. In contrast, analyzed data 140 is connected directly to the server 130. These connections are merely illustrative. In modern systems, remote data (such as raw data 150) can be accessed as easily as local data (such as analyzed data 140) by the server 130. The raw data includes 150 at least target data (data related to targets), attribute data (which may comprise attributes associated with, and incorporated into target data), and transaction data.

The present disclosure relates to the user interface 112 and a particular technique for generating and presenting such this user interface 112. This disclosure has general applicability but will be described herein in a particular context for the purpose of illustration. This context is the analysis of donors and contributions for a charitable organization. The use of this context should not be considered limiting, as the interfaces, systems, and methods presented herein could be used in a variety of contexts including for-profit industries and even with non-business-related data.

In this context, the raw data 150 may comprise data that can be used to determine some characteristics of the donors or donations. For example, raw data 150 may comprise attributes (or fields) such as a donor's name, an address, phone number and/or email contact information, whether they are an individual or an entity (such as a foundation), as well as transaction information about past giving and financial information that may be acquired about the donor. The raw data 150 is shown in two parts, mainly database data 152 and original data 154. The only difference between these two types 152, 154 of raw data 150 is that the data in the database data 152 is controlled by a database system, such as a database server, that was programmed to exist as part of the system 100, while the original data 154 is not. Because the underlying data is essentially the same, this description will refer to both original data 154 and database data 152, as simply raw data 150. In some embodiments, the original data 154 comes directly from a CRM (or Customer Relationship Management) system. The system 100 can work with a variety of brands and types of CRM systems as a data source. While a CRM system certainly structures the data it maintains, it is not structured optimally for use in the system 100. The database data 152 obtains data from the original data 154 and then structures and summarizes that data in a way optimal for system 100.

The server 130 uses the raw data 150 and the analyzed data 140 to present user interfaces to the user device 110. The analyzed data 140 includes the results of the analysis described below on the raw data 150. In one embodiment, the analyzed data 140 is created by an artificial intelligence (AI) system 160. In the embodiment shown in FIG. 1, the AI system 160 utilizes a learning engine 170 to train a machine learning algorithm, a prediction engine 180 that used the trained machine learning algorithm to make predictions and recommendations, and a data provision engine 190. The data provision engine 190 is a means to provide data from the prediction engine 180 to other devices, the data being in any suitable format, such as JSON, CSV, PDF, or a custom file format. In one embodiment, the output from the data provision engine 190 comprises the analyzed data 140.

According to this embodiment of FIG. 1, the AI system 160 utilizes a machine learning algorithm capable of receiving as input data the raw data 150, which is shown in FIG. 1 by arrow 162. The learning objectives for the AI system 160 is to identify certain targets (target data) as more preferable than other targets. In the context of charitable contributions, the targets are past, current, and potential donors that are to be included in efforts to encourage giving. While the phrase "AI algorithm" is used to describe the programming used by the AI system 160, the training models of the type used by the AI system 160 can also be considered machine learning algorithms, or deep learning algorithms, or even statistical machine learning algorithms. Regardless of the description and type of programming involved, the AI system 160 must be capable learning, based on the input of raw data 150, to generate predictions on targets.

Note that a "target variable" in machine learning is generally considered to be the variable that is being modeled and predicted by the other variables. The other variables are sometimes referred to as the feature variables, with the target variable being dependent on the feature variables. The use of the term "target" is used in this example embodiment in a similar sense—the targets in the non-profit donor environment are the potential donors that are to be focused upon (targeted) with additional emphasis (such as direct advertising) in order to obtain a healthier giving portfolio for a non-profit. In the other contexts mentioned herein, the target might be a patron or customer of a for-profit company, or an employee in an enterprise Because the described embodiments can be used in other contexts and in other embodiments, the generic term target will be used to refer to the objects to be targeted as a result of the analysis by the AI system 160. It is to be understood that even though the AI system 160 identifies a first target as a valuable target for emphasis, while a second target is considered less valuable, both remain "targets" in this description.

In some contexts, the AI system 160 will be used to develop predictions based on statistical analysis of attributes related to the targets. These different attributes, and more particular the statistical analysis of these attributes, will be referred to herein as key performance indicators (or KPIs). The KPIs, which are discussed in more detail below, are generally found in the database data 152, with the database engine acquiring data from the original data 154 of the CRM system and applying statistical analysis to develop the KPIs.

Finally, in some portions of this disclosure, the analyzed data 140 and the AI system 160 that created it are considered to be part of a predictive module 142. For example, the server 130 can be described as using data received from "the predictive module 142" to create the graphical user interface 112.

Targets and Subsets

Figure 2:
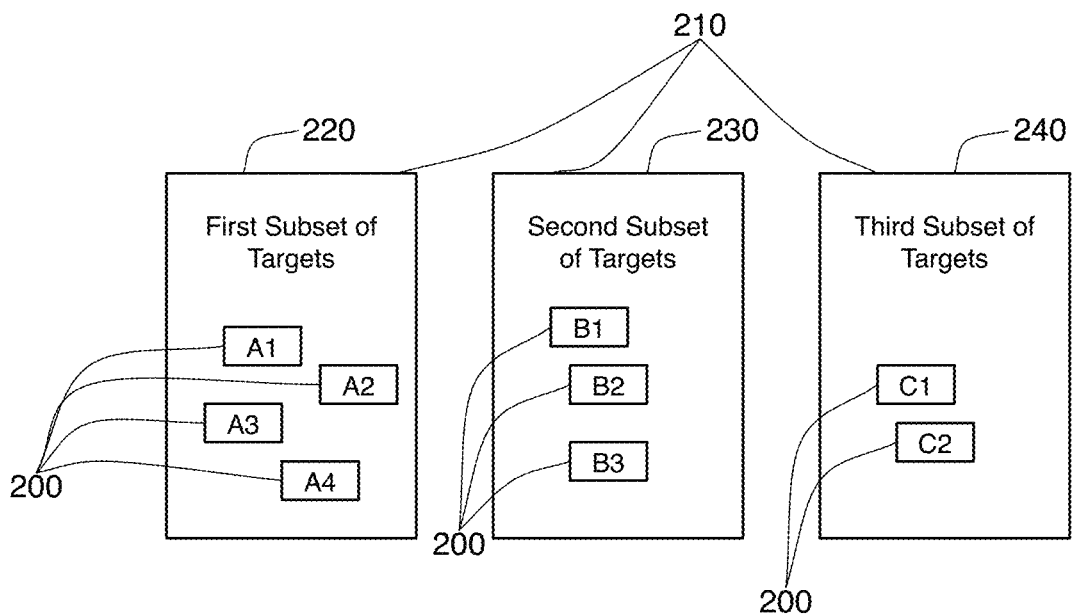
FIG. 2 is a schematic illustration of a subset of targets.

In FIG. 2, targets 200, which are embodied as target data elements in system 100, are shown as small boxes and are divided into three subsets 210, namely a first subset 220, a second subset 230, and a third subset 240. The reason that targets 200 are divided into subsets 210 is that they are to be treated, in part, separately by the AI system 160 based on these subsets 210. This is true only in part because the AI system 160 will also analyze the targets 200 individually and as an entire collective. As can be seen in FIG. 2, the first subset 220 is associated with four target data elements 200, the second subset 230 is associated with three target data elements 200, and the third subset 240 is associated with two target data elements 200. There is no need for the targets 200 to be divided equally between the subsets 210.

Figure 3:
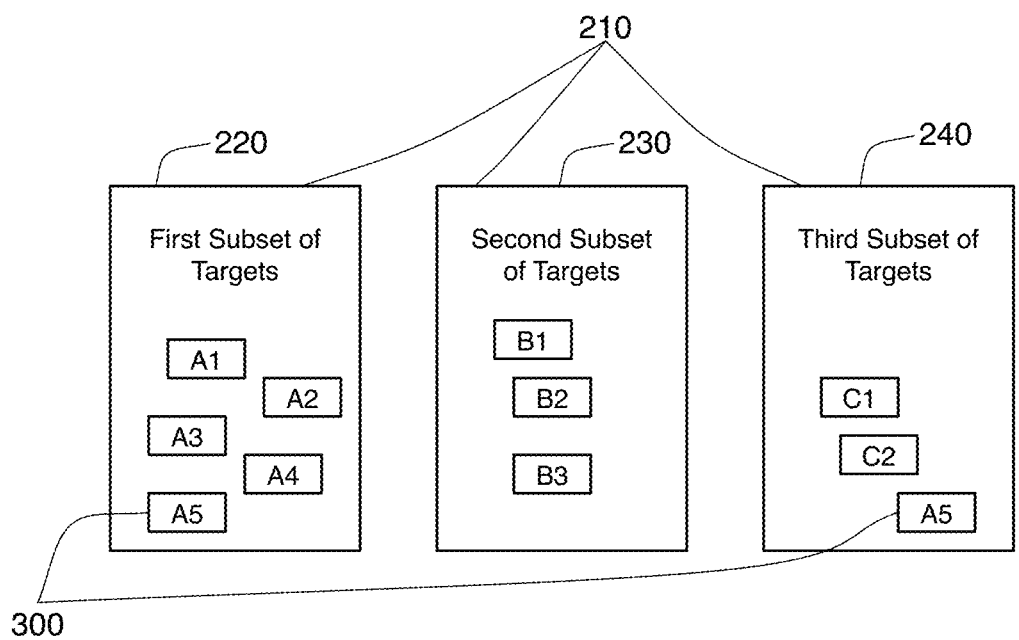
FIG. 3 is a schematic illustration of a subset of targets similar to FIG. 2 with a target existing in multiple subsets.

In some embodiments, individual target data elements 200 can be associated with in multiple subsets 210. In FIG. 3, target A5 300 is found in both the first subset 220 and the second subset 230.

In the example embodiment relating to charitable donations, the targets 200 will be separate donors, and the subsets 210 will be configured to categorize donors based on various attributes relating to their past donations. The number of donations, the time since the last donation, and the value of the donations could all be analyzed in order to create the categories of donors that are to form the subsets 210.

Strategy Subsets as Part of a Lifecycle

Figure 4:
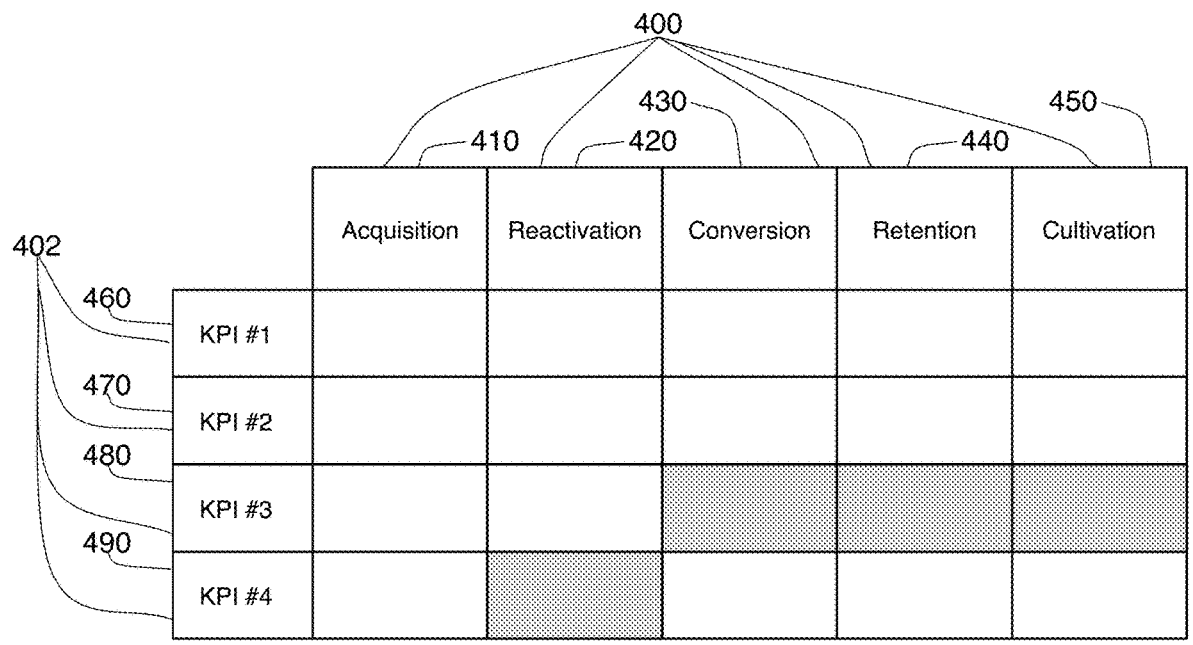
FIG. 4 is a table illustration of strategies and associated KPIs.

FIG. 4 shows distinct subsets 210 that have been identified in an embodiment based upon the charitable giving example. These five particular subsets 210 are also referred to as strategies 400. The strategies 400 shown in FIG. 4 are labeled the acquisition strategy 410, the reactivation strategy 420, the conversion strategy 430, the retention strategy 440, and the cultivation strategy 450. These strategies have been selected to reflect an understanding that targets 200 in some context will naturally move through a "lifecycle," meaning that they will naturally transition from one strategy 400 to another. In the context of charitable donations, the strategies 400 shown in FIG. 4 represent different phases in which a donor (target 200) may move in connection with their giving to a particular charitable organization. In other words, strategies 400 are particularly defined subsets 210 of targets 200 in which targets 200 are expected to move between the different strategies 400 over time. The movement between strategies 400 can be considered stages of a lifecycle. These stages need not be linear. In other words, the movement between strategies 400 over time need not move in a straight line from acquisition strategy 410 to reactivation strategy 420 to conversion strategy 430, etc.

In FIG. 4, the acquisition strategy 410 relates to new donors (or patrons), meaning that this subset 210 will include non-participating targets 200 that are hopefully about to become new donors to the organization. The reactivation strategy 420 encompasses lapsed donors—targets 200 that have given to the organization (or made a purchase) in the past but have not given recently. The conversion strategy 430 includes donors that have given a first gift but have yet to give a second time. The retention strategy 440 relates to active donors that haven't given for a while, and therefore are in danger of becoming lapsed donors (they are lapsing). The cultivation strategy 450 relates to active, non-lapsing donors that have given multiple times. As can be seen, a particular target 200 could move between these different strategies 400 in their lifecycle as a donor to an organization, and the particular target 200 may exist in more than one stage at a time (e.g., in both the conversion strategy 430 and the retention strategy 440).

Lifecycle strategies 400 exist in other contexts as well. For example, employees in an enterprise can be considered the targets, and the different subsets 210 for these targets might include "potential employees," "new hires," "middle management," "employees with minor children," "senior management," and "near retirees." These subsets 210 can be considered lifecycles strategies 400 as the targets can move through these different subsets 210 in their life as an employee at the enterprise. As can also be seen in this example, it is again not necessary that the strategies 400 be mutually exclusive.

It is preferred that each strategy 400 in a lifecycle be considered important in maintaining the health of an enterprise. In the context of FIG. 4, keeping targets active and participating through their donations in each of the five identifies strategies 410, 420, 430, 440, 450 is considered important to the financial health of the non-profit. In the context of employees, keeping each of the strategies 400 active and content in their jobs is also important to the overall health of the enterprise.

The AI system 160 is designed to analyze the targets 200 in each strategy 400 and select particular targets 200 for emphasis. In the context of donating to a charitable organization, the emphasis might be marketing that is individually directed to the targets 200, such as a direct mail marketing plan or other direct marketing. In the context of employees in an enterprise, the emphasis might be bonus dollars, or new employee advertising, or health care benefits, etc.

Analysis of donations, such as through the AI system 160, has shown that it is important to keep each strategy 400 "healthy." A health score for a particular strategy 400 can be determine by examining data concerning the targets 200 within those strategies 400. In particular, key performance indicators 402 (the KPIs) are identified that reflect the health of the constituent targets 200 within each strategy 400.

FIG. 4 shows four different KPIs, namely KPI #1 460, KPI #2 470, KPI #3 480, and KPI #4 490. These KPIs 402 identify the health and performance of the targets 200 in each strategies 400. Each KPI 402 relates to a particular statistical analysis for data concerning targets 200 in the strategies 400. In the donation embodiment, example KPIs 402 might include the raw number of targets in a strategies 400, the average frequency of donations by the targets 200, the average gift given by the targets 200, or the total income received from the targets 200. This last KPI 402 (total income received) is actually the mathematical equivalent of multiplying the first three example KPI values (number of donors*frequency of donations*average value of gift).

Optimizing the health scores of strategies 400 based on a plurality of KPIs 402 is different than simply applying machine learning to maximize an overall result. For instance, some prior art systems utilize machine learning techniques to maximize a single variable—donation income for the charitable organization. This is the only value that is being analyzed. The machine learning system will therefore identify only donors that are most likely to make contributions, and perhaps in particular which donors are most likely to make significant contributions. Emphasis on these donors (spending money on advertising to these donors) may maximize the total contribution received for that amount of emphasis, but this approach prioritizes a short-term income gain at the expense of long-term health of the organization. In particular, such an approach sacrifices the health of the separate strategies 400. Analysis indicates that, in order to create long-term organizational health, care must be taken to nurture each strategy 400 in a lifecycle of targets 200 while also addressing current goals.

Figure 5:
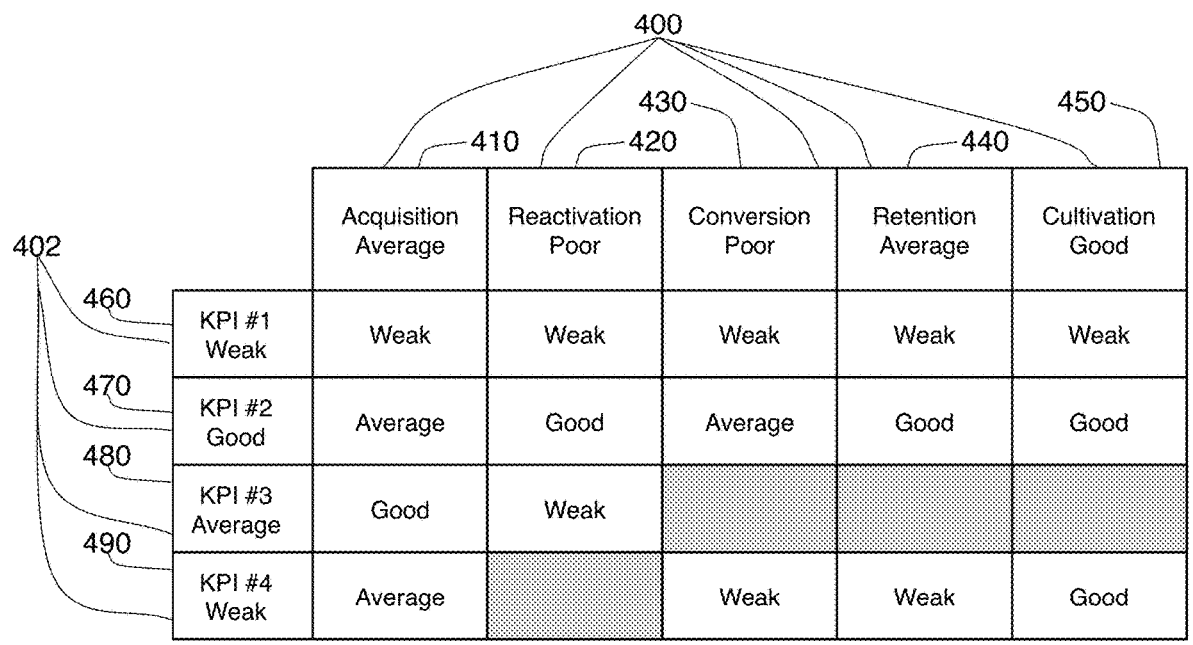
FIG. 5 shows the table illustration of FIG. 4 with the assignment of strength values to strategies, KPIs, and intersections.

The vertical columns in FIG. 4 relate to a division of targets 200 based on strategies 400. In some embodiments, each strategy is mutually exclusive (such as is shown in FIG. 2), while in other embodiments a target can exist in multiple strategies 400 (such as target A5 300 in FIG. 3). Meanwhile, the horizontal rows in FIG. 4 relate to KPIs 402, which comprise statistical characterizations of data concerning the targets 200. In FIG. 5, these verticals (strategies 400) and horizontals (KPIs 402) are scored based upon trending data. Intersections exist between the verticals and horizontals, such as the intersection between KPI #1 460 and the Conversion strategy 430. The score of that intersection shows the trending data of that KPI #1 460 for the subset of targets 200 that fit within that strategy 430. In FIG. 5, the trending data is considered "Weak." The same KPI #1 460 can be examined for the other subsets of targets 200 for each of the strategies 400. However, regardless of which strategies 400 is examined, the trending data for KPI #1 460 is Weak. Thus, it is not surprising that when KPI #1 460 is applied to all of the targets 200, the overall score for KPI #1 460 is also Weak, which is seen in the left-most column on FIG. 5. Thus, FIG. 5 shows that overall, KPI #1 460 is weak, KPI #2 470 is Good, KPI #3 480 is Average, and KPI #4 490 is Weak. Similarly, overall scores can be given for the separate strategies 400 based on the score of primary KPIs 402 for each strategies 400. Thus, acquisition strategy 410 is Average, reactivation strategy 420 is Poor, conversion strategy 430 is Poor, retention strategy retention strategy 440 is Average, and cultivation strategy 450 is Good.

Note that some KPIs 402 may not be applicable for all strategies 400. For instance, KPI #3 480 is not applicable to the conversion strategy 430, the retention strategy 440, or the cultivation strategy 450, thus these intersections are grayed out in FIG. 5. It is possible for a single KPI 402 to apply to only a single strategies 400. In some cases, there is no overlap between the KPIs 402 used to determine the health score of a first strategy 400 (such as acquisition strategy 410) and the KPIs 402 used to determine the health score of a second strategy 400 (such as cultivation strategy 450). The particular KPIs 402 used to determine the health score of a strategy 400 are considered the primary KPIs 402 for that strategy 400. The selection of the primary KPIs 402 for a strategy 400 can be accomplished through human analysis, or through the analysis of the AI system 160. The AI system 160 can be tasked to identify the strongest correlation between changing KPIs 402 and some outcome-based reflection of health score for the strategy 400. Those KPIs 402 with the strongest correlation are good candidates for being the primary KPIs for a strategy 400. For example, in the context of employees, one KPI 402 could relate to "missed days from work to care for sick children." This KPI 402 may be very relevant for a strategy 400 related to "employees with children" but may not be relevant at all to the "potential employee" or "near retirement employee" strategies 400.

Segments User Interface 600

FIG. 6 shows a user interface 600, which can be one of the graphical user interfaces 112 created by the system 100. This display shows the same strategies 400 shown in FIGS. 4 and 5. Strategies 400 relate to subsets 210 of targets 200, as explained above. In FIG. 6, four of the five strategies 400 have been divided into sub-subsets, referred to as segments 620. Thus, the conversion strategy 430 has two separate segments 620, namely "single potential major," and "single potential multi." However, the acquisition strategy 410 contains only a single segments 620, which includes all of the targets 200 in the strategies 400.

Each segment 620 is given a score 640 based on the trending data for the primary KPIs 402 used to analyze the strength of this segments 620. In many cases, the primary KPIs 402 for each segment 620 will be the same as the primary KPIs 402 for the parent strategy 400, but this need not always be the case.

FIG. 6 also shows additional information. For example, a tab bar 610 could be used to allow a user to switch between different interfaces. User interface 600 relates to the "Segments" tab on the tab bar 610. Choosing the "Selection" tab might result in the presentation of interface 1100 shown in FIG. 11. The "Seasonality" tag is particularly relevant to donations, in that it may show the seasonality of giving (changes in giving patterns based on the time of the year) for individual targets 200 and for strategies 400 as a whole.

The score 640 shown in user interface 600 for a segments 620 is dependent upon the scores of the primary KPIs 402, with the scores generally being based on trending data for those KPIs 402. Trending data for a specific KPI 630 can be shown directly in this interface 600 to give the user some understanding as to why the score 640 for that segments 620 is what it is. Finally, user interface 600 also includes a predictive prescription 650 for each segments 620 that does not have a score 640 of Good. A predictive prescription 650 is a recommendation on targets 200 to emphasize in order to improve the score 640 for that segment 620. Effectively, the predictive prescription 650 is the output of the predictive module 142 that is relevant to a particular segment 620.

Method 700—Train AI System

Figure 7:
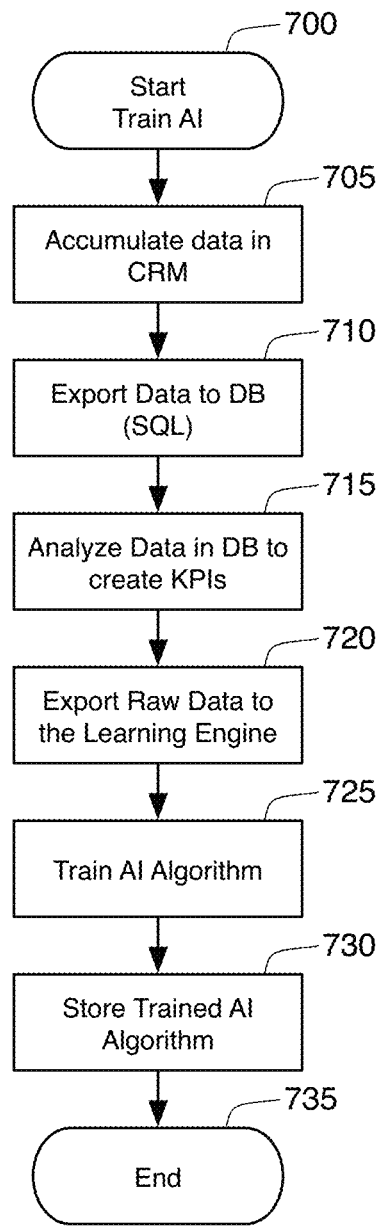
FIG. 7 is a flow chart showing a process for training an AI algorithm.
Figure 8:
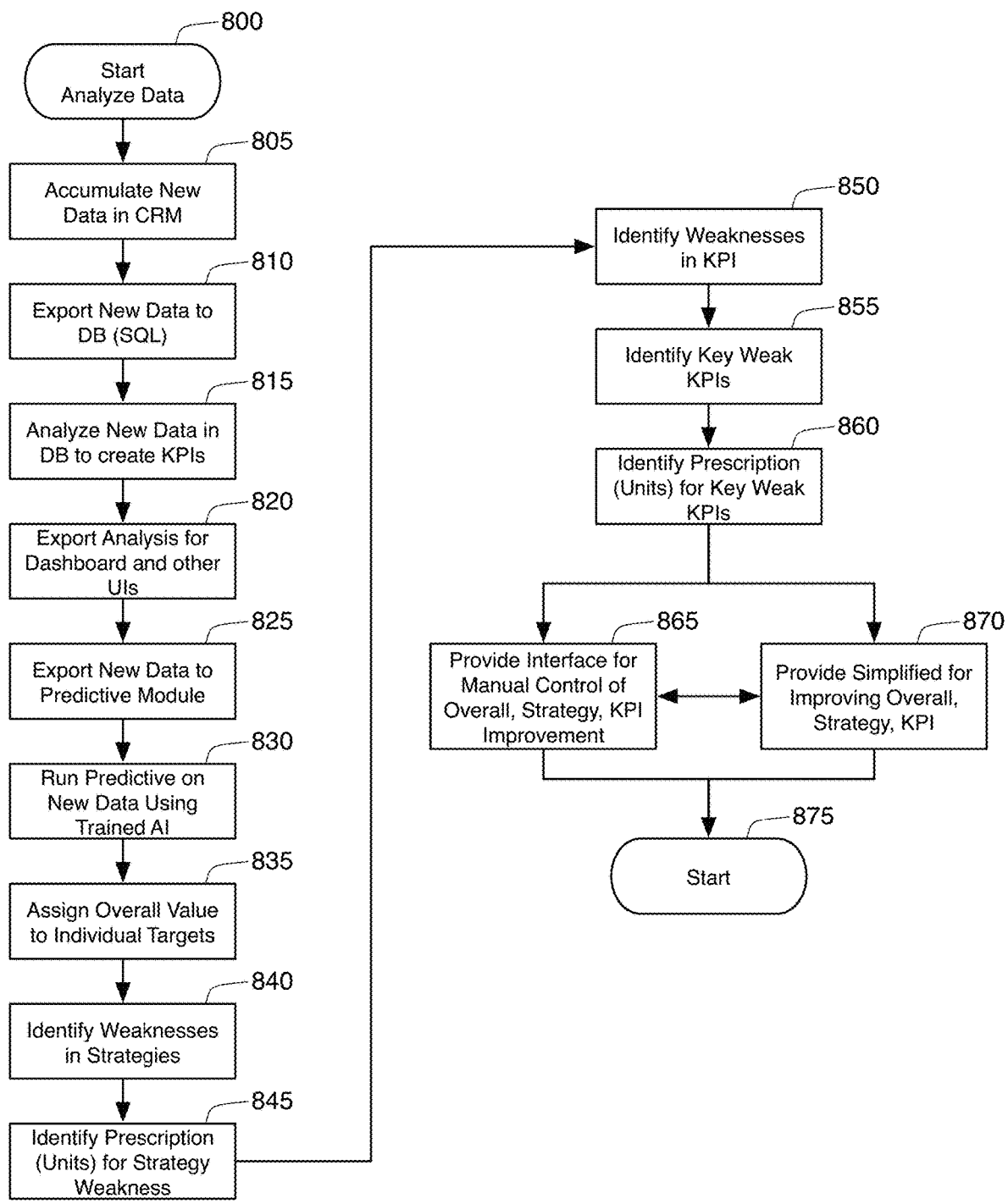
FIG. 8 is a flow chart showing the use of the trained AI algorithm of FIG. 7 for the analysis and presentation of data.

The predictive prescriptions 650 are created by the prediction engine 180, which requires a trained machine learning algorithm created by the learning engine 170. FIG. 7 shows a method 700 used by the learning engine 170 for training the AI engine with a training set. FIG. 8 shows a related method 800, by which the prediction engine 180 uses the trained AI engine to provide analyzed data 140 for the server 130 to create the graphical user interfaces 112.

Method 700 starts at step 705 with the accumulation of data in a Customer Relationship Management system, or CRM. As explained above, the CRM data can be considered the original data 154 of FIG. 1. A CRM system does do some analysis of this data, effectively creating KPIs 402 for that data. However, most CRM systems will create only a half dozen or so different KPIs 402, which is insufficient for the machine learning process described herein. Consequently, at step 710, the original data 154 is exported from the CRM and imported into a customized database system to form the database data 152. At step 715, the database system (SQL) analyzes this data to create hundreds of different KPIs 402. The database system may also identify subsets 210 of targets 200 to create the various strategies 400 described above (or these strategies 400 may be developed through human analysis). All of this data and organization is stored as database data 152.

At step 720, the raw data 150 including the database data 152 is exported into the learning engine 170 in order to train the AI algorithm at step 725. In this step 725, an untrained learning algorithm receives this data, which might include data about targets 200, transaction data, and previous predictions. The goal of this training is to have the AI algorithm trained to identify targets 200 for emphasis, such as identifying donors for direct marketing. The AI system 160 is particular designed to identify the best targets that best improve the health of the strategies 400 and segments 620. As explained above, a health score is determined by primary KPIs 402 that are used to generate score 640. Thus, the AI system 160 must also be capable of improving the health score of specific KPIs 402 overall as well as selectively for improving the health of specific strategies 400 and segments 620.

In some embodiments, some targets 200 may be defined as "definitely include targets," which should always be selected for emphasis, or "definitely exclude targets," which should never be selected for emphasis. Information about these inclusions and exclusions can be included in the training data to improve predictions by the AI algorithm. This information is also utilized as part of the interface 1100 described below when selecting targets for emphasis.

In the context of donations to a non-profit, part of this analysis (but by no means all) will identify targets 200 that will improve the overall giving to the organization. The AI algorithm may further be able to predict the income anticipated from a group of targets that have been emphasized (through a marketing or advertisement campaign, for instance). But the analysis will also be designed to improve scores for specific strategies 400 and KPIs 402 even if this does not improve the overall giving to the organization. In other words, the goal for the AI engine will be to improve the "verticals" and the "horizontals" of the chart shown in FIG. 5. For example, AI algorithm should be able to identify targets 200 that are likely to start giving (be "successfully acquired"), which would be a successful interaction in the acquisition strategy 410, or might identify targets 200 that have lapsed but are likely to make a new gift, which would be a successful interaction in the reactivation strategy 420. Some of these targets 200 in the reactivation strategy 420 may be part of a "lapsed major" giver segment 620, so emphasizing those targets would improve that segment 620 of the reactivation strategy 420. Still other targets 200 might be identified that have the best chance of improving KPI #4 490 across all strategies 400.

Figure 9:
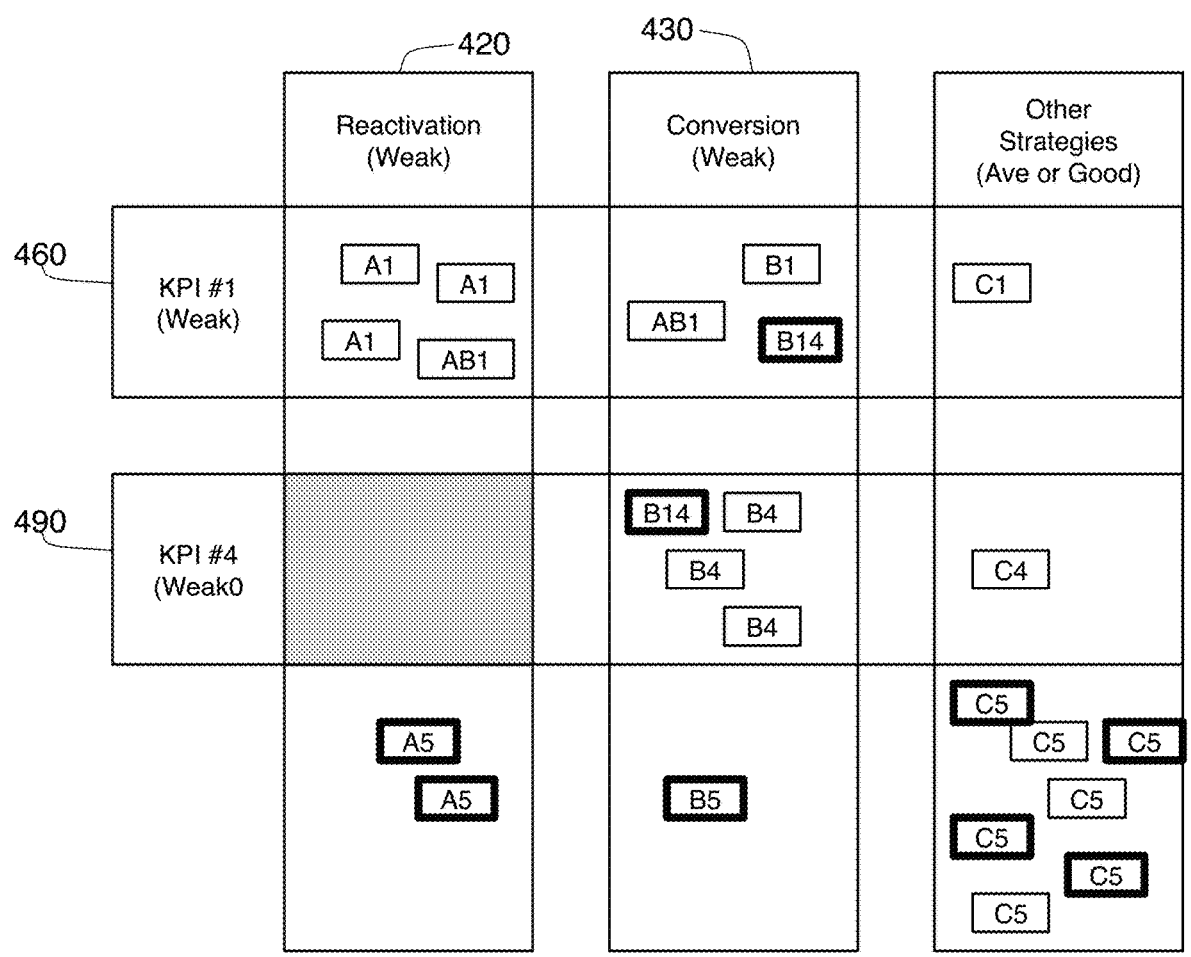
FIG. 9 is a schematic representation of individual targets in strategies and KPIs.

Part of the AI algorithm's goal would be to identify weak strategies 400 and weak KPIs 402, and then to select a minimal subset of targets 200 that could best improve those weaknesses. FIG. 9 shows two strategies 400, namely reactivation strategy 420 and conversion strategy 430, and two KPIs 402, namely KPI #1 460 and KPI #2 490. As shown in FIG. 5, these strategies 400 and KPIs 402 were considered Weak. FIG. 9 shows individual targets 200 that could be used to strengthen these areas. Each target 200 is represented as a rectangle with a letter (representing a vertical or strategy 400) and a number (representing a horizontal or KPI 402). Targets 200 with a letter "A" could be emphasized to improve reactivation strategy 420, and with a letter "B" could be emphasized to improve reactivation strategy 420. Targets 200 with a thicker, bold outline are potential large givers. A machine learning algorithm that focused solely on improving overall giving would focus on the bolded targets 200, including the four such targets 200 labeled C5. But these C5 labeled targets will not improve any of the Weak strategies 400 or the Weak KPIs 402. Thus, directing the AI algorithm to strengthen Weak strategies 400 and KPIs 402 will likely result in emphasizing a different grouping of targets 200. In at least one embodiment, the AI algorithm will be able to concentrate on the particular targets 200 that will improve a weak KPI 402 for a weak strategy 400 (or segment 620). In FIG. 9, these targets 200 appear at the intersections of the vertical strategies 400 and the horizontal KPIs 402.

Remember, of course, that not all KPIs 402 are relevant to the scoring of every strategies 400. One additional task that could be given to the training of the AI algorithm at step 725 is to identify which of the potentially hundreds of KPIs 402 are truly representative of the overall health of the strategies 400 and should be selected as a primary KPI 402 for a given strategy 400. This can be analyzed by the AI engine as it identifies movement of targets 200 through the different lifecycle strategies 400. In an analysis of the raw data 150 over time, certain targets 200 will drop out of the analysis, while other targets 200 will move to different strategies 400 that represent a beneficial outcome for the entity. The AI engine can then associate the good movement of targets 200 within the strategies 400 with particular KPIs 402, and the dropping out or downward movement of targets 200 with other KPIs 402. These KPIs 402 can then be designated as primary KPIs and be used to generate a health score 640 for a strategy 400 or segment 620.

The training that occurs at step 725 can be based on a pattern recognition model that is used to predict results. The raw data 150 is gathered and divided into a training dataset and a testing dataset. The training dataset is used for an initial training of the AI algorithm and the testing dataset is then applied to the first training to test the model. Training rules are provided to the untrained AI algorithm as the criteria for output decisions. The testing data is used to check whether the accurate output is attained after the model has been trained, and then that same data can be used to retrain the model.

While the current disclosure may favor the use of a Convolutional Neural Network (CNN) for the AI algorithm, it is anticipated that any algorithm with an acceptable accuracy may also be used. This may include other types of neural networks, classifiers, computer vision algorithms, statistical algorithm, structural algorithms, template matching algorithms, fuzzy-based algorithms, hybrid algorithms, deep neural networks, feature space augmentation & auto-encoders, aenerative adversarial networks (GANs), and meta-learning.

In one embodiment relating to donations to non-profit entities, the AI algorithm will be tasked with identifying how income was derived. This helps to identify the "weakest link in the chain," namely that part of income generation that shows the slowest growth. The AI algorithm then identifies targets 200 to emphasize that will most effectively remove the drag on performance. This can be accomplished for each strategy 400, which will each have their own Compounded Annual Growth Rate (CAGR). The AI engine will find the weakest link in each strategy 400 with respect to CAGR and identify the targets 200 who have the most probability to remove that drag. By doing so, income in that strategies 400 will naturally increase.

At step 730, the trained AI algorithm is stored for later use in connection with method 800. The training method 700 then ends at step 735.

Method 800—Analyzing Data

FIG. 8 shows a method 800 for analyzing data using the trained AI algorithm from method 700. Method 800 uses the prediction engine 180 and the data provision engine 190 to create the analyzed data 140, that is then used by the server 130 to provide the graphical user interface 112 to the user device 110.

Method 800 starts at step 805, in which new data for an enterprise is accumulated at a CRM system as original data 154. This data 154 is then exported to database data 152 (step 810), where the database engine then analyzes the data in order to generate values for KPIs 402 for that new data (step 815). Even this analysis can generate interesting and useful results in the form of these KPIs 402. Consequently, at step 820, the results of this analysis and the calculated KPIs 402 are exported for use in a dashboard and other user interfaces at step 820. This same data is also be exported to the predictive module 142 at step 825.

The predictive module 142 will then use the trained AI algorithm from method 700 to analyze this received module and then create the analyzed data 140 at step 830. The results of step 830 are shown in FIG. 8 as additional steps 835-860. At step 835, for example, the result of this analysis will assign an overall value to each of the targets 200. This value might be based on, in the context of donations to a non-profit, the expected dollars to be given by that target 200 over the next twelve months. Alternatively, the time frame may be twenty years. In the context of employees, the overall value might relate to expected years of future service as an employee, or a more amorphous "employee value" score. The overall value becomes a single value (typically a number) that is assigned to that target 200.

At step 840, the predictive module 142 will also identify weaknesses in the strategies 400. For example, particular weak strategies 400 (such as reactivation strategy 420 or conversion strategy 430) could be identified that needs strengthening. In other embodiments, step 840 would identify weaknesses in segments 620 in the same fashion. At step 845, the predictive module 142 will use the trained AI algorithm to identify a predictive prescription 650 for these identified weakness. The predictive prescription 650 will identify targets 200 that are found in a weak strategy 400 or segment 620 that would be susceptible to emphasis (such as direct marketing) so as to improve the performance of that weak strategy 400 or segment 620. The trained AI algorithm effectively identifies a likelihood that a particular target 200 will respond to emphasis in a way that improves the performance of a weak strategy 400 or segment 620.

Similarly, at step 850, the predictive module 142 will identify weaknesses in the KPIs 402. For example, particularly weak KPIs 402 (such as KPI #1 460 or KPI #4 490) could be identified that needs strengthening. However, not all KPIs 402 are equally valuable. Some KPIs 402 have been identified as primary KPIs 402 that are reflective of the health of strategies 400. In some embodiments, other KPIs 402 may be considered as important even if that KPIs 402 is not used as a primary KPI 402 to develop a score 640 for any strategy 400 or segment 620. Step 855 therefore identifies these valuable KPIs 402 that are showing weakness. At step 860, the predictive module 142 will use the trained AI algorithm to identify a predictive prescription 650 for those weak valuable KPIs 402. As before, the predictive prescription 650 will hopefully identify targets 200 that are found that would be most susceptible to emphasis (such as direct marketing) so as to improve the performance of valuable KPIs 402. In other words, at step 845, the trained AI algorithm generates a prediction identifying a likelihood that a particular target 200 will respond to emphasis in a way that improves the performance of a KPI 402.

The method 800 then presents two different user interfaces depending on the choices of the user. At step 865, the method 800 presents an interface for manual control of improving the overall value for an enterprise, and for improving particular strategies 400, and/or valuable KPIs 402. One such interface is described below in connection with FIGS. 11 to 15. Alternatively, at step 870, the method 800 presents a simplified interface for improving overall value, weak strategies 400, and weak key KPIs 402. Such an interface is described below in connection with FIG. 16. In at least one embodiment, the user can select whether to use the interface of step 865 or the interface of step 870, or whether to switch between these two interface. When the user is done with these interfaces, the method 800 stops at step 875.

Method 1000 and Interface 1100
Presentation of the Interface

Figure 10:
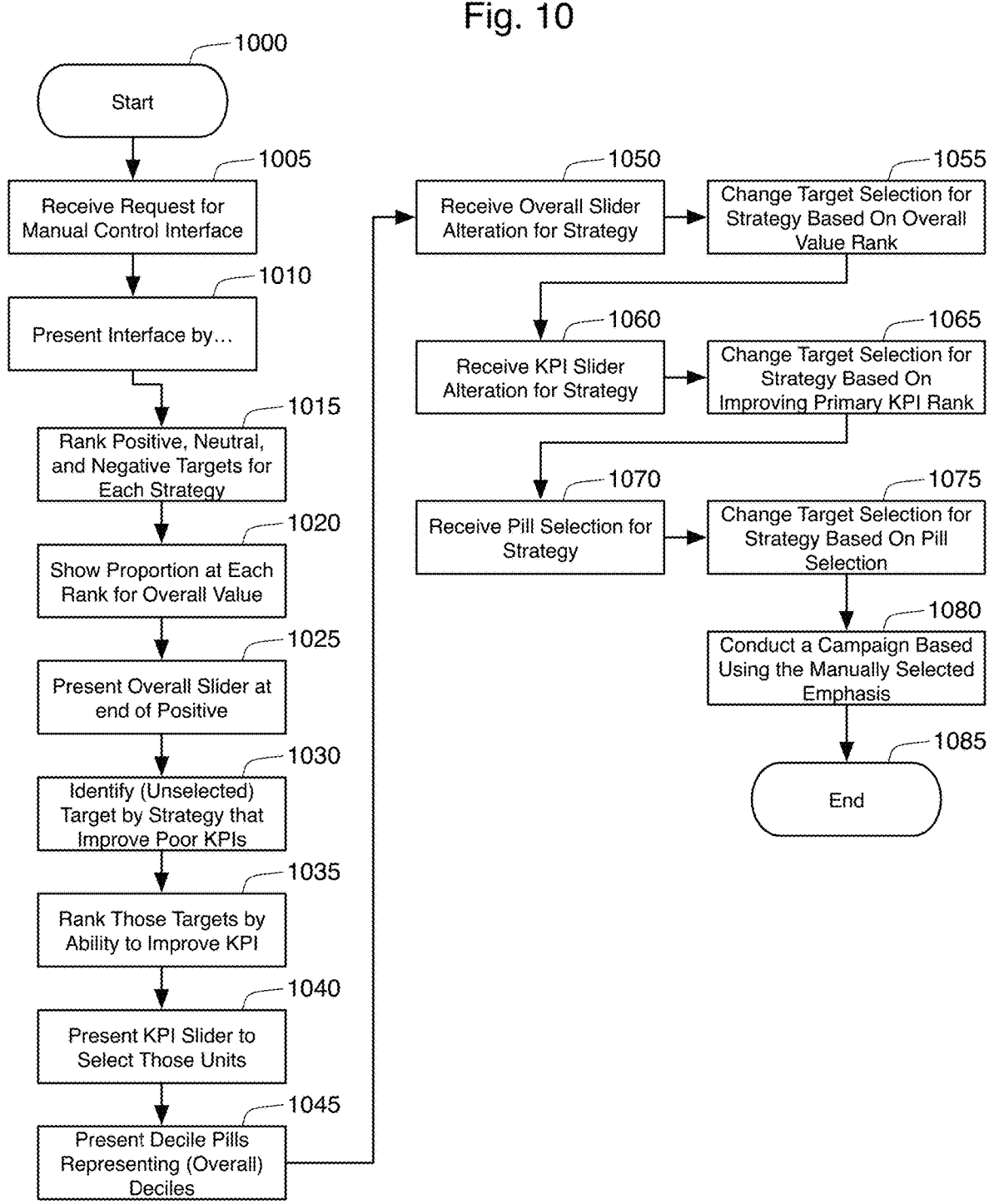
FIG. 10 is a flow chart showing a process for manual alteration of the selection of targets.
Figure 11:
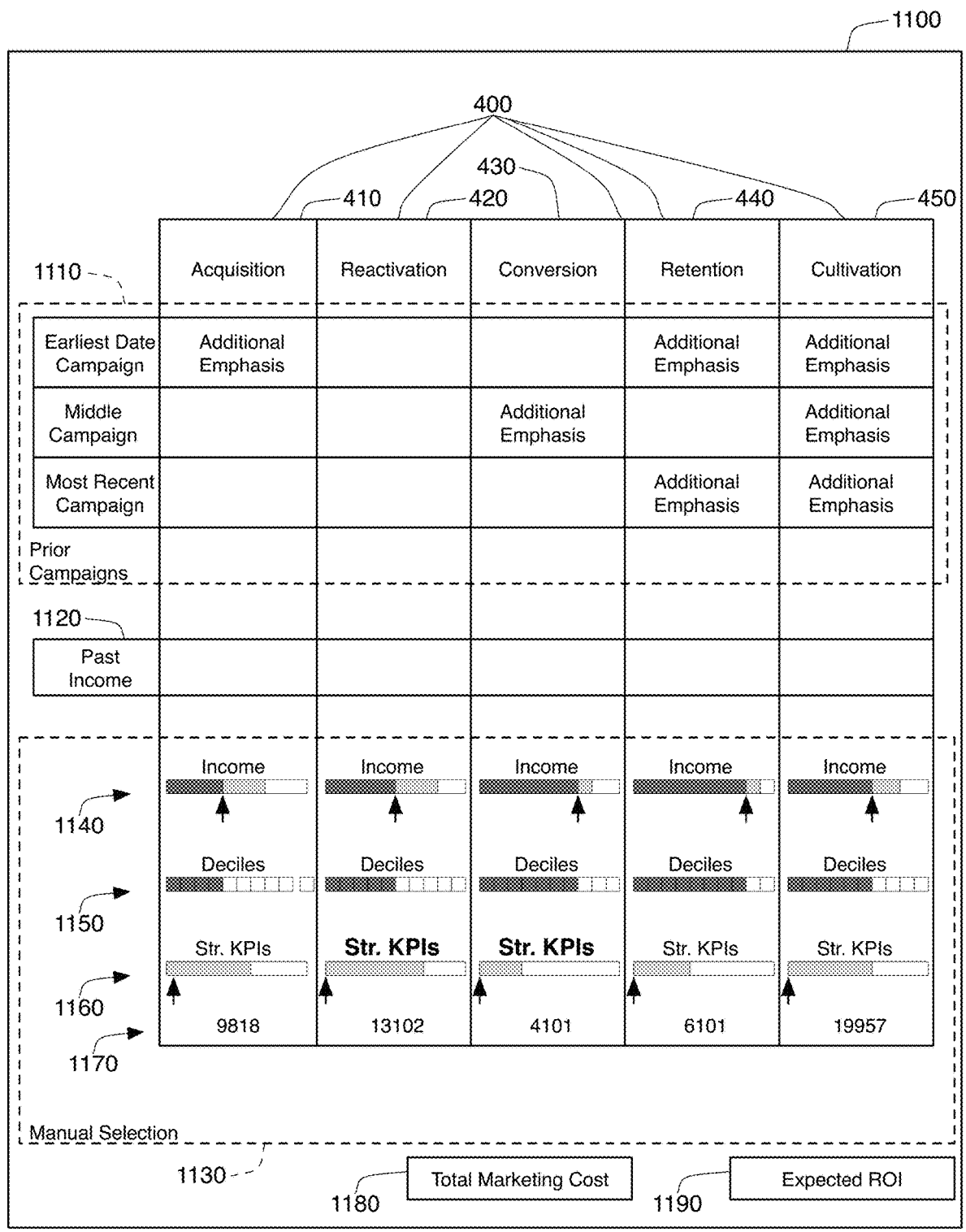
FIG. 11 shows a user interface for the manual alteration of the selection of targets.

FIG. 10 shows a method 1000 of presenting and interacting with interface 1100 (shown in FIG. 11). The method 1000 starts at step 1005, where the server 130 receives a request from the user device 110 to present the manual control interface 1100 (step 865). The interface 1100 is then presented in step 1010. The presentation of the interface 1100 can occur through the creation of a web page, with the system 100 acting as a web server and the user device 110 presenting the graphical user interface 112 through a web browser. Alternatively, the user device 110 may be operating its own application software (or app) for the purpose of creating the graphical user interface 112. Such application software would also be capable of directly interacting with the server 130 over the computer network 120. In this situation, the server 130 will provide the data necessary for the application operating on the user device 110 to generate the graphical user interface 112.

As can be seen in FIG. 11, the interface 1100 shows vertical columns for a plurality of strategies 400, namely acquisition strategy 410, reactivation strategy 420, conversion strategy 430, retention strategy 440, and cultivation strategy 450. The top portion 1110 of this interface 1100 relates to historical actions relating to this data. This portion 1110 is labeled "Prior Campaigns." A campaign in the context of fund raising for a non-profit is an advertising or marketing campaign to donors and potential donors that takes place within a given time period. The interface 1100 of FIG. 11 shows three different campaigns in the prior campaign portion 1110, namely an earliest date campaign, a middle campaign, and a most recent campaign. These three campaigns intersect with the different strategies 400, and values can be placed in these intersections. In some embodiments, these values indicate both the amount of cost spent to emphasize each strategy 400 in each campaign, and the amount of income received from each strategies 400 in each campaign. In a particular campaign, additional emphasis might have been manually placed on a particular strategy 400 for a campaign. This information is what is shown in FIG. 11. In particular, the figure shows that the earliest date campaign put additional emphasis on the acquisition strategy 410, the retention strategy 440, and the cultivation strategy 450. The middle campaign put additional emphasis on the conversion strategy 430 and the cultivation strategy 450. The most recent campaign put additional emphasis on the retention strategy 440 and the cultivation strategy 450. The total past income 1120 from all of the campaigns in the prior campaign portion 1110 is also shown in the interface 1100, with the total past income 1120 divided by strategies 400.

The interface 1100 also includes a manual selection interface 1130, which is shown on near the bottom of FIG. 11. This portion 1130 of the 1100 is shown after several user adjustments in FIGS. 12, 13, and 15. The manual selection interface 1130 includes three different types of interface elements for each strategy 400, namely an overall slider 1140, a set of decile pill selectors 1150, and a strengthen KPIs slider 1160. The overall slider 1140 is shown in FIG. 11 with the label "Income," because in the context of donations to a non-profit, the overall value described above was related to the anticipated income to be received from a target 200 if that target were emphasized. At the bottom of each strategies 400 is also a count number 1170, which indicates the number of targets 200 that are found in each strategies 400.

At the bottom of interface 1100 is the total campaign cost 1180 based on the selected targets 200 and previously input campaign costs (which may be designated on a per target basis). The interface 1100 also shows an estimated net ROI 1190 for the campaign based on the selected targets 200.

Method 1000 shows the presentation of the interface 1100 at step 1010. However, to properly create all aspects of the interface 1100, the method 1000 must perform substeps 1015-1045. This is shown by the indentation of these steps in FIG. 10.

In order to properly configure the overall slider 1140, step 1015 will need to rank the individual targets 200 that reside in each of these strategies 400 according to overall value, which was described above. This occurs at step 1015. As part of this step, each target 200 will be characterized as a positive target 200 (likely to increase the overall value if emphasized), a neutral target 200 (likely to maintain the overall value if emphasized), or a negative target 200 (likely to decrease the overall value if emphasized). This ranking occurs at step 1015. In the example embodiment, the emphasize relates to individual marketing by a non-profit for the purpose of fundraising. Such emphasis on a target will incur a cost. Typically, the cost is on a per target 200 basis, with each target 200 likely to cost a similar amount to emphasize. A neutral target 200 is predicted to be a target where the cost of emphasis is likely to be approximately equal to the expected gain from that emphasis. A positive target 200 is likely to be one where the cost of emphasis is less than the expected gain, and a negative target 200 is likely to be one where the cost of emphasis is more than the expected gain. In other words, spending money to emphasize negative targets 200 is likely going to cost more than the benefit gained.

But an analysis that rests solely on the overall value and the positive, neutral, and negative value of individual targets 200 is short cited. Frequently, emphasis on a neutral or negative value target 200 will strengthen a strategy 400 or a KPI 402. Nonetheless, the positive, neutral, or negative characterizations for targets 200 are presented in the interface 1100 for the benefit of the users. At step 1020, the relative proportion of positive, neutral, and negative characterizations for targets 200 is presented in the interface 1100 through the overall slider 1140. A bar 1240 (shown in FIG. 12) is presented in the overall slider 1140 with three different shadings. The darkest shading represents the percentage of targets 200 in the strategies 400 that have been characterized as positive, the medium shading represents the percentage of targets 200 in the strategies 400 that have been characterized as neutral, and the lightest shading (or white) represents the percentage of targets 200 that have a negative characterization. The pointer 1242 in each of the income sliders 1140 for the strategies 400 in FIG. 11 is shown at the right-most edge of the positive characterization bar, indicating a default selection of all targets 200 in each of the strategies 400 that have been characterized as having a positive increase in the overall value if emphasized. This location of the pointer 1242 further indicates that no selection has been made of any of the neutral or negative targets 200. The position of the pointer in this position is performed at step 1025 of method 1000.

At steps 1030, the server 130 identifies a set of targets 200 in each strategies 400 that are going to be selectable through the strengthen KPI slider 1160. At step 1035, this set of targets 200 are then ranked using the analysis of the predictive module 142 based on their ability to strengthen the KPIs 402. In particular, the targets 200 in the set are ranked on their ability to strengthen primary KPIs 402 that are considered to be weak for this particular strategies 400. Referring back to FIG. 5 for illustration, the targets 200 selected by step 1030 for acquisition strategy 410 are sorted primarily on their ability to strengthen KPI #1 460 (which was considered Weak), and then based on their ability to strengthen KPI #2 470 and KPI #4 490 (which were considered Weak). In contrast, the targets 200 in reactivation strategy 420 are ranked first on their ability to strengthen KPI #1 460 and KPI #3 480 (which were both Weak for reactivation strategy 420). At step 1040, strengthen KPI slider 1160 is then presented on the interface 1100 for each strategies 400. The strengthen KPI slider 1160 is also shown as a bar and a slider, with the slider being movable to select additional targets 200 to strengthen the primary KPIs 402 for that strategy 400.

As shown in FIG. 6, the score 640 can be assigned to individual segments 620 as well as to strategies 400. In one embodiments, all segments 620 defined for a strategy 400 are separately considered when selecting which KPIs 402 should be strengthened for a strategy 400. For the reactivation strategy 420, for instance, FIGS. 4 and 6 suggests that while the entire reactivation strategy 420 has a score of Poor, the worst segments 620 are the "Lapsed Major," Lapsed Potential Major," and the "Lapsed Single" segments 620. By focusing only on these segments 620, it is possible that the targets 200 selected for strengthening the primary KPIs 402 will be different that would be selected if the entire reactivation strategy 420 were considered.

The strengthening of the KPIs 402 for a particular strategy 400 will strengthen the overall score 640 for that strategies 400. Thus, strengthening KPI #1 460 and KPI #3 480 for the targets 200 in reactivation strategy 420 will strengthen the overall score for the reactivation strategy 420. At the same time, this action will strengthen the scores for KPI #1 460 and KPI #3 480 overall, which were known to be Weak and Average respectively (as shown on FIG. 5). A user indicates a desire to strengthen a particular strategy 400 by sliding the pointer in the strengthen KPI slider 1160 to the right. Thus, the movement of the strengthen KPI slider 1160 under reactivation strategy 420 will strengthen the reactivation strategy 420, KPI #1 460, and KPI #3 480. This is generally true—movement of any of the strengthen KPI sliders 1160 will strengthen both the strategies 400 and the primary KPIs 402 for that strategy 400.

The initial movement of the pointer on the strengthen KPI slider 1160 to the right will select those targets 200 that the AI system 160 determined likely to improve the weakest primary KPIs 402 for that strategy 400. Additional movement will expand the selection to include those targets 200 that the AI system 160 determined likely to improve the stronger primary KPIs 402 for that strategy 400. Moving the pointer on the strengthen KPI slider 1160 all the way to the right will select all targets 200 that the AI system 160 determined likely to improve all of the primary KPIs 402 for that strategy 400.

A review of FIG. 5 shows that the reactivation strategy 420 and the conversion strategy 430 are relatively weak strategies. To present this information to the user of interface 1100 so that the user will know which strategies 400 need additional strengthening, a visual identifier is provided on the interface 1100 near the strengthen KPI slider 1160 for those strategies 400. In FIG. 11, the visual identifier is accomplished by bolding and enlarging the type face for the labels on the strengthen KPI sliders 1160 under these strategies 400. Other methods of visually bringing a user's attention to the need to strengthen these particular strategies 400 could also be implemented, such as different color fonts, highlighting of the labels, or even highlighting or shading the entire vertical column for weak strategies 400.

Step 1030 identifies and sorts a set of targets 200 that will be controlled by the strengthen KPI slider 1160. Movement of the strengthen KPI slider 1160 for a particular strategy 400 will select additional targets 200 for emphasis. The identification of the targets 200 affected by the strengthen KPI slider 1160 can vary in different embodiments. In one embodiment, only targets 200 that are not selected by the position of the overall slider 1140 are included in this set. Thus, if the overall slider 1140 is at the default position, such that all positive targets 200 are already selected, the set identified in step 1030 will include only neutral and negative targets 200 (the targets 200 not selected at step 1025). The selection of these targets 200 are therefore not predicted to be revenue positive, but they will strengthen the strategies 400 and the KPIs 402. In another embodiment, all targets 200 are selected at step 1030, and both the overall slider 1140 and the strengthen KPI slider 1160 represent the total number 1170 of targets 200 in each strategies 400. However, these two sliders 1140, 1160 rank these targets 200 differently. Slider 1140 ranks the targets 200 based on overall value. Slider 1160 ranks these targets 200 based on ability to strengthen the primary KPIs 402 for a strategies 400. Therefore, it would be possible to select the 60% highest ranked targets 200 through the overall slider 1140 and the 60% highest ranked targets 200 in the strengthen KPI slider 1160 but still not select all the targets 200 in the strategies 400. This is because there is likely a great deal of overlap in the individual targets 200 selected by each slider 1140, 1160.

At step 1045, decile pill selectors 1150 are displayed in the interface 1100. Each decile pill selector 1150 contains ten separate pills (blocks) 1250 that individually represent 10% groupings (deciles) of all the targets 200 in the strategies 400. The ranking of targets 200 to create these decile percentages is based on overall value, which is the same ranking used in overall slider 1140. In interface 1100, each decile pill 1250 that is selected is shaded dark, while unselected decile pills 1250 are shaded light (white). When the overall slider 1140 and the decile pill selector 1150 are not manually changed, the area to the left of the pointer in the overall slider 1140 should roughly correspond to the shaded pills 1250 in the decile pill selector 1150.

Interaction with the Interface

The manual selection interface 1130 is designed to allow users to manually select different targets 200 for future emphasis. In the context of donors and fundraising for a charitable organization, the future emphasis would be a marketing campaign seeking donations.

Step 1025 of method 1000 has already made an initial selection of targets 200 for the campaign, namely all of the targets 200, in whatever strategies 400 they might be found, that the predictive module 142 has identified with a positive value. In other words, according to the AI algorithm trained through method 700 and populated with live, relevant data in method 800, these pre-selected targets 200 are the ones most likely to increase be "worth the money" to emphasize (market to) in this campaign. This is a relatively standard result of AI analysis in this context.

The manual selections allowed through manual selection interface 1130, however, allow users to strengthen their strategies 400 and the KPIs 402. As explained above, strengthening the strategies 400 and the KPIs 402 will lead to a stronger organization and a stronger pool of givers in the long run, even if the immediate return on investment is not optimized.

Figure 12:
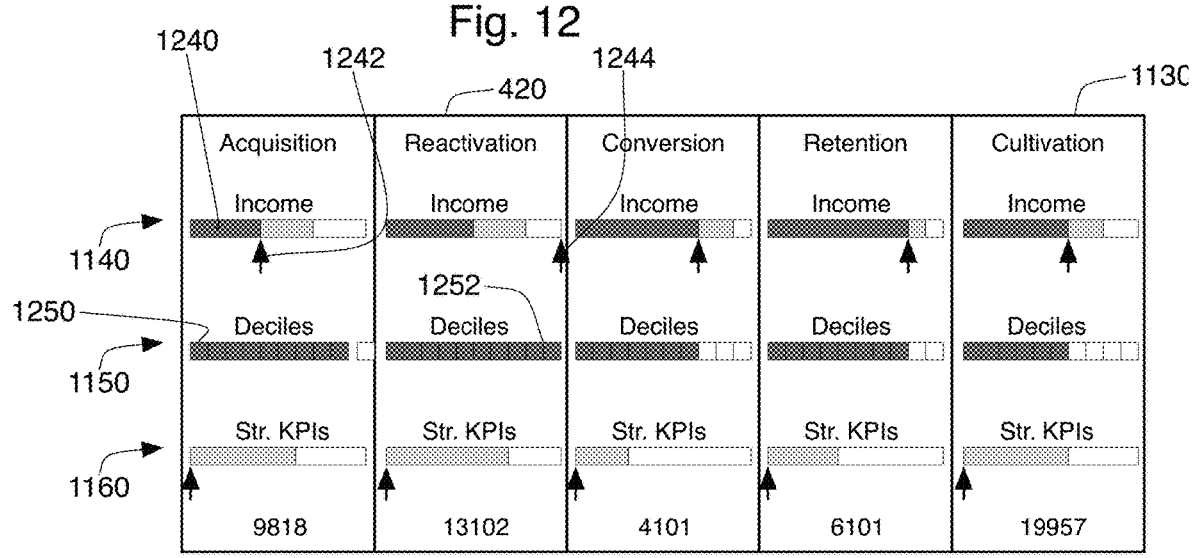
FIG. 12 shows a portion of the user interface of FIG. 11 after a first alteration.

The next step in the method 1000, namely step 1050, is for the server 130 to receive from the interface 1100 an alteration for an overall slider 1140. In FIG. 12, the pointer 1244 in the overall slider 1140 in reactivation strategy 420 has been slid to the right-most edge of the overall slider 1140. In effect, the user has elected to select all of the targets 200 that are associated with the reactivation strategy 420. This selection is then made at step 1055. This will certainly strengthen the reactivation strategy 420 and the KPIs 402 that are associated with the reactivation strategy 420. In effect, by going beyond the standard selections in the reactivation strategy 420 made at step 1025, the user has elected to put additional emphasis on the reactivation strategy 420. Returning to FIG. 11, when looking at top portion 1110, it is seen that each of the earlier three campaigns also put additional emphasis on specific strategies 400, although none of the previous campaigns had ever put additional emphasis on the reactivation strategy 420.

It will be noted that the separate pills 1252 in the decile pill selector 1150 for the reactivation strategy 420 have now all been filled. Since the overall slider 1140 and the decile pill selector 1150 are based on the same sorting, the sliding of pointer 1242 will correspondingly alter the darkened pills 1250 in the corresponding decile pill selector 1150. It is also possible that the pointer for the strengthen KPI slider 1160 for the reactivation strategy 420 will also move all the way to the right, to indicate that all targets 200 associated with the reactivation strategy 420 have now been selected.

Figure 13:
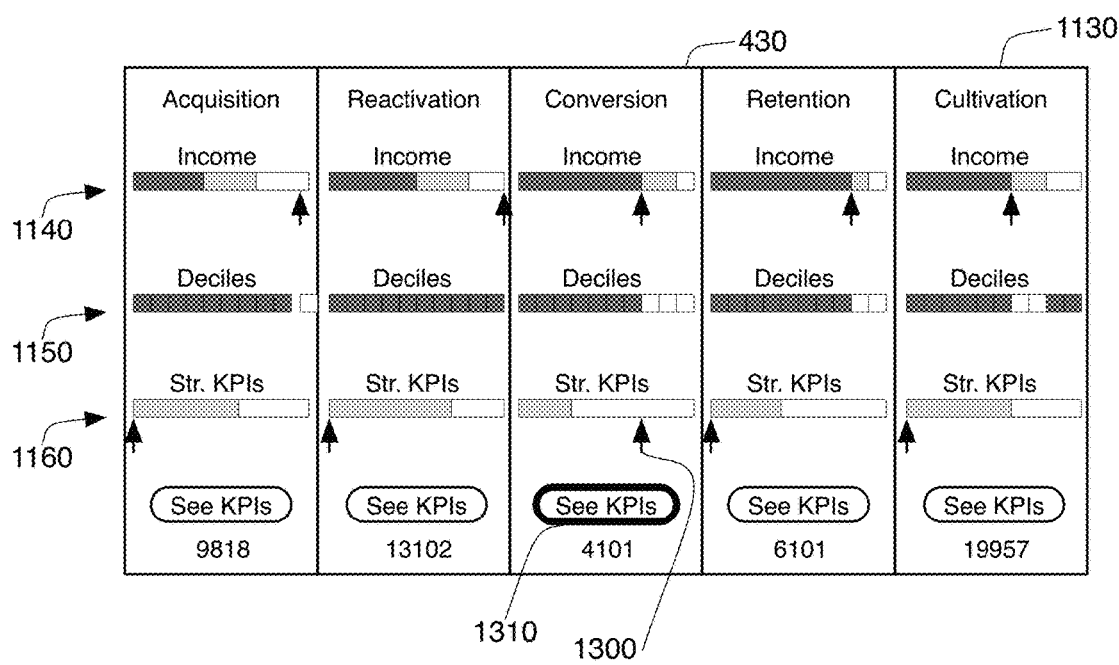
FIG. 13 shows a portion of the user interface of FIG. 11 after a second alteration.
Figure 14:
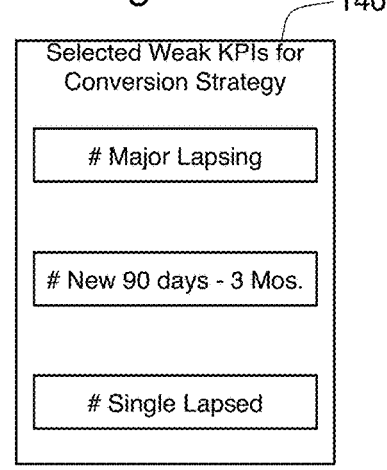
FIG. 14 shows a pop-up user interface showing primary KPIs for a strategy.

At step 1060, the server 130 receives from the interface 1100 an alteration for one of the strengthen KPI sliders 1160. This is shown in FIG. 13, where pointer 1300 in the strengthen KPI slider 1160 for the conversion strategy 430 has been moved. This time the pointer 1300 has move approximately 70% of the way to the right. This action will change the selection of targets 200 for the conversion strategy 430 at step 1065. This change will include additional targets 200 that were selected and ranked by the predictive module 142 particularly to strengthen the conversion strategy 430 and the associated primary KPIs 402. The primary KPIs 402 that are strengthened by the movement of one of the strengthen KPI sliders 1160 will vary by strategy 400, as explained above. This means that it may not always be clear to a user which KPIs 402 are being strengthened. Thus, the example manual selection interface 1130 shown in FIG. 13 includes additional buttons 1310 that allow users to see exactly which KPIs 402 are improved by moving the strengthen KPI slider 1160 for a strategy 400. If a button 1310 is selected, a pop-up interface 1400 (shown in FIG. 14) is presented that discloses the primary KPIs 402 that are improved by altering a particular strengthen KPI slider 1160.

Figure 15:
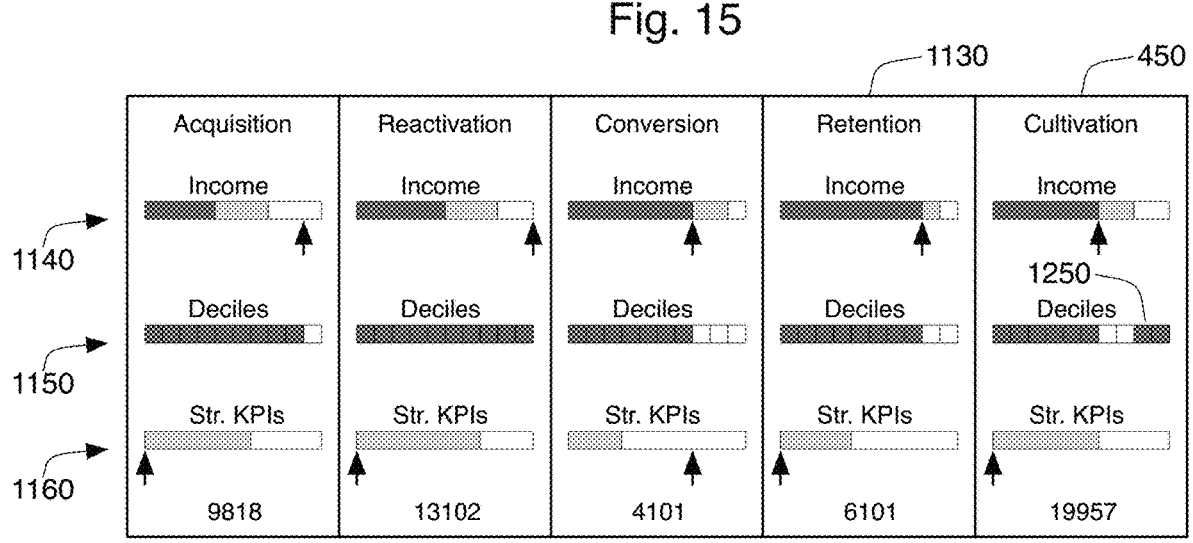
FIG. 15 shows a portion of the user interface of FIG. 11 after a third alteration.

At step 1070, the server 130 receives from the interface 1100 an alteration for one of the decile pill selectors 1150, and this is implemented in step 1075. In FIG. 15, the manual selection interface 1130 is shown after a user has selected the last two separate pills 1250 in the decile pill selector 1150 for the cultivation strategy 450. By making this selection, the user has added additional targets 200 to the ones selected for the next emphasis campaign. The overall slider 1140 for the cultivation strategy 450 has already selected the first 60% of the targets 200 in the cultivation strategy 450. This selection is for the top 60% of targets in the cultivation strategy 450 when ranked according to overall values assigned by the predictive module 142. The selection of the last two decile pills 1250 in FIG. 15 indicates that the lowest two decile ranges (the lowest 20%) have also now been selected (with those targets 200 ranking between 60% and 80% remaining unselected).

This type of selection can be useful when a user wants to make sure that no targets 200 go unselected for too many campaigns even though they are ranked near the bottom based on overall value. The user may have selected the 9th and 10th decile pills 1250 for this campaign because the user selected the 7th and 8th decile pills 1250 for the most recent campaign. Together, this will ensure that all targets 200 for the cultivation strategy 450 have been included over the last two campaigns even though the predictive module 142 selected only the top 60% of this strategy 400. As was the case for the selection in step 1050, the selections in step 1060 and step 1070 have caused additional emphasis to be placed on particular strategies 400. In particular, the three manual changes shown in FIG. 15 have emphasized the reactivation strategy 420, the conversion strategy 430, and the cultivation strategy 450 in this campaign.

Step 1080 will then include all of the selected targets 200 for the next emphasis campaign. In some embodiments, the system 100 is responsible for running the emphasis campaign, such as by initiating a direct mail advertising campaign. In other embodiments, the system 100 is only responsible for outputting a list of selected targets 200 so that the campaign can be performed outside of the system 100. The selected targets 200 may be further modified by inclusion lists (identifying targets 200 that must always be included) and exclusion lists (identifying targets 200 that must always be excluded). The method 1000 ends at step 1085.

Simplified Interface 1600

Figure 16:
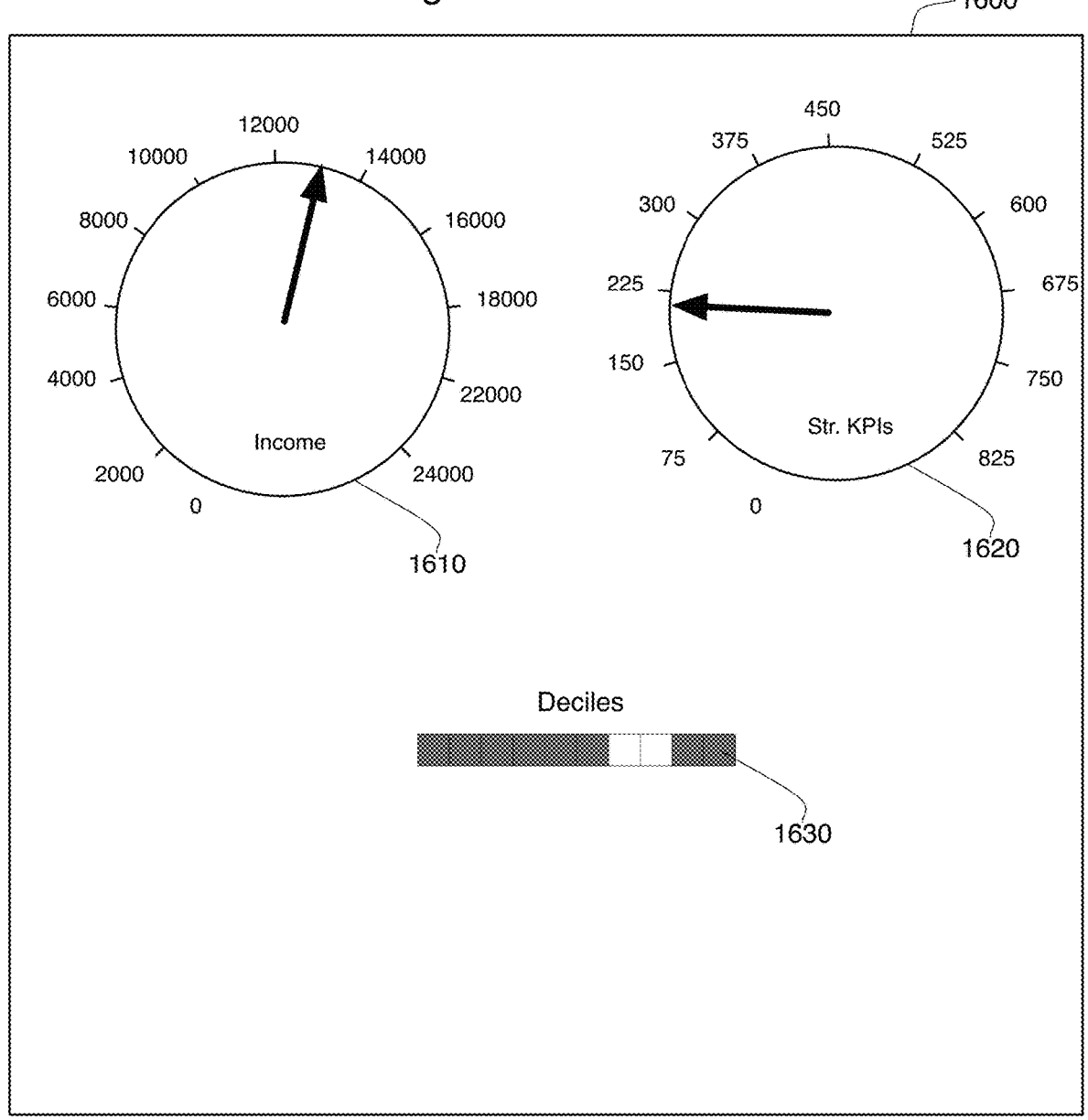
FIG. 16 shows a simplified user interface for the selection of targets.

FIG. 16 shows a simplified interface 1600 of the type that might be presented at step 870 in method 800. This interface 1600 hides the separate strategies 400 from the user, but still takes advantage of the analysis performed through method 800 on the various strategies 400 and KPIs 402. In this interface, the income dial 1610 effectively takes the place of all of the overall sliders 1140 shown interface 1100. Instead of step 1025 setting multiple pointers on multiple overall sliders 1140 at a location that select all of the positive value targets 200 for each strategies 400, step 1025 now combines the data from all of the strategies 400 into a single interface dial 1610. Although it is not shown in FIG. 16, this dial 1610 also have highlighting to indicate where the division between the positive value targets 200 and the neutral value targets 200 exists, and also where the negative value targets 200 begin. Moving this dial 1610 through simplified interface 1600 will change the percentile level of the selected targets 200 based on the overall value assigned by the predictive module 142.

Similarly, the strengthen KPI dial 1620 is the combination of all the strengthen KPI sliders 1160 shown for the individual strategies 400 in interface 1100. Movement of this strengthen KPI dial 1620 will cause additional targets 200 to be selected for the next campaign based on the analysis and sorting accomplished by the predictive module 142. As explained above, the targets 200 here will be sorted based on which targets 200 can most strengthen the individual strategies 400 and the associated KPIs 402. Moving the dial upward will therefore strengthen the individual strategies 400 even if such movement doesn't strengthen the overall value of the selected targets 200. In the preferred embodiment, the sorting for the combined strengthen KPI dial 1620 will emphasize the weakest strategies 400 first. Thus, in the context of FIG. 5, moving the KPI dial 1620 upward will first strengthen the reactivation strategy 420 and the conversion strategy 430 (which are the weakest), then the acquisition strategy 410 and retention strategy 440. The cultivation strategy 450 would be strengthened last, because it was strongest.

Inside each of these strategies 400, movement of the dial could also be divided between the different primary KPIs 402, so that that initial movement of the dial 1620 will first strengthen the weakest primary KPI 402 for the weakest strategy 400. In one embodiment, the sorting of targets 200 selected by the strengthen KPI dial 1620 will first strengthen all the primary KPIs 402 for the weakest strategy 400, and the strengthen all the primary KPIs 402 for the second weakest strategy 400. In another embodiment, all the primary KPIs 402 for all strategies 400 are sorted together, with the weakest primary KPI 402 being strengthened first, and the second weakest primary KPI 402 being strengthened second, even if these two different KPIs 402 are primary KPIs for different strategies 400.

Finally, the individual decile pill selectors 1150 from interface 1100 can also be combined into the overall decile selector 1630. As with the decile pill selector 1150 and the overall slider 1140, the overall decile selector 1630 is based on the same sorting as used for dial 1610. Thus, changes to the dial 1610 are immediately shown on the overall decile selector 1630. But the overall decile selector 1630 allows for non-linear selection of deciles, such as the first highest ranked 60% as selected by 1610, with the lowest ranked 20% also selected (as shown in FIG. 16).

User Interfaces Using Graphical Units

Figure 17:
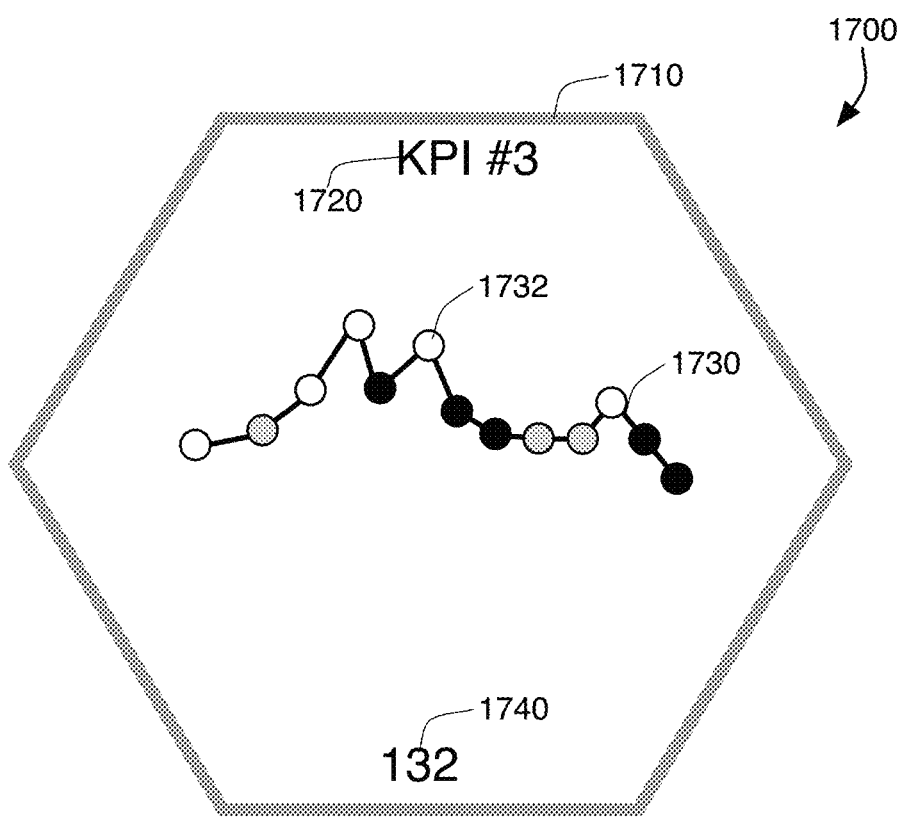
FIG. 17 is a schematic representation of a graphical unit for a user interface.

As explained above, step 820 can export the data and developed KPIs 402 from the database data 152 for the purpose of developing dashboards and other user interfaces designed to simplify the hundreds of KPIs developed by the database. In one embodiment, these user interfaces use one or more graphical units 1700 as shown in FIG. 17 to visually represent a particular KPI 402 and the change in that particular KPI 402 over a time period. In FIG. 17, the graphical unit 1700 takes the shape of a hexagon. The graphical unit 1700 contains at least four separate elements. An outer periphery 1710, a title 1720, a graphical spark line 1730, and a value 1740.

Figure 18:
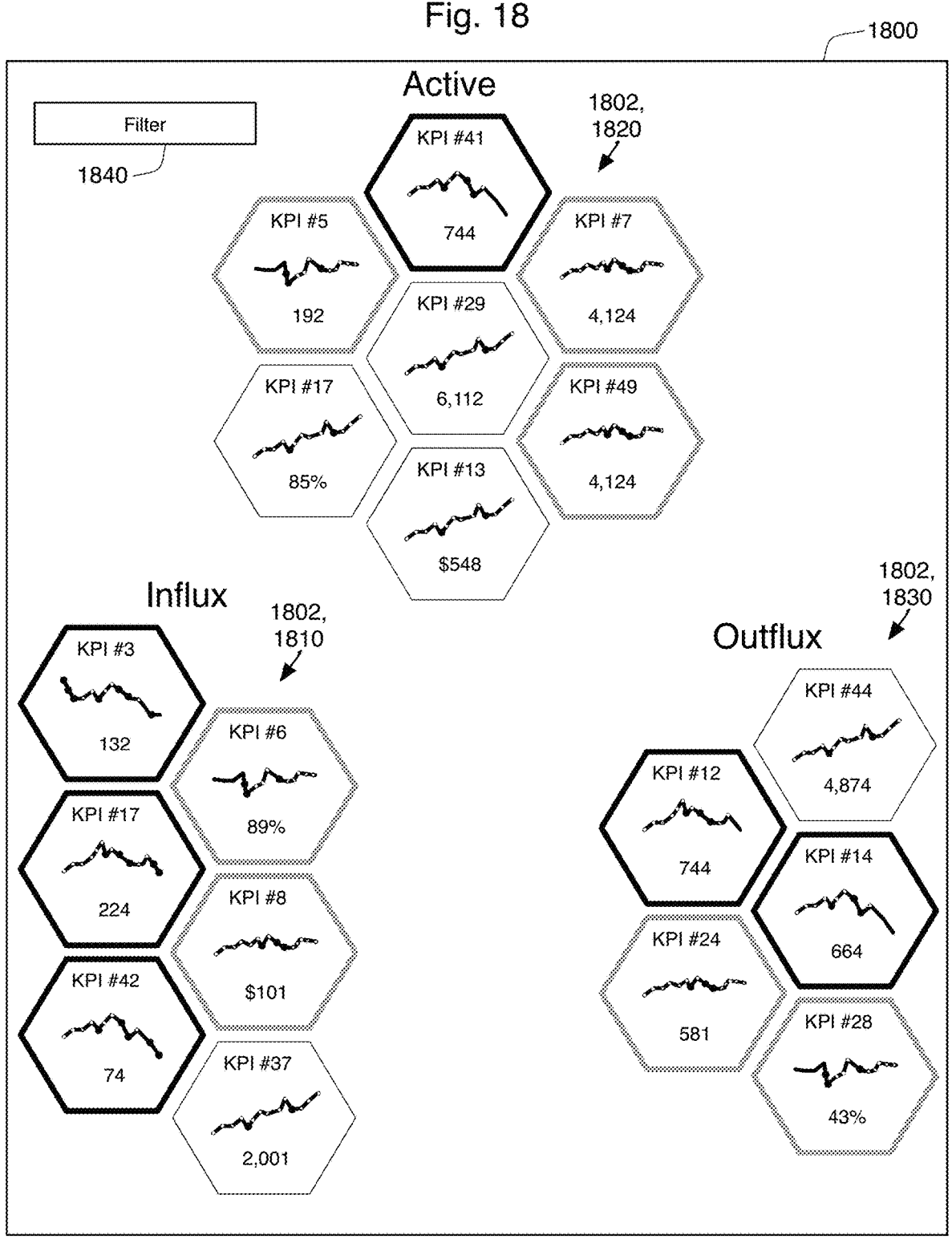
FIG. 18 shows a user interface comprising a plurality of the graphical units of FIG. 17.

FIG. 18 shows an example user interface 1800 that utilizes a plurality of these graphical units 1700 to simultaneously show trend data related to multiple KPIs 402. In these figures, a single graphical unit 1700 contains data for a single KPI 402. The hexagon shape of the outer periphery 1710 allows numerous KPIs 402 to be presented side-by-side without getting lost in a sea of rows and columns, which would be the case if a square periphery 1710 were used. Similarly, a circular shape would provide less visual impact and would render it easier to become visually lost in an interface presenting numerous graphical units 1700. Instead, interface 1800 presents the graphical units 1700 slightly off-set from one another, relying on the hexagon shape of the outer periphery 1710 to improve the readability of the interface 1800.

FIG. 17 shows an outer periphery 1710 having a thick gray border. In at least one embodiment, the outer periphery 1710 of each graphical unit 1700 is presented in color, as either red, yellow, or green. In FIGS. 17-23, the color red is represented as a thick black border, the color yellow is presented as a thick gray border, and the color green is represented as a thin black border. While these colors can be altered in different embodiments, they are chosen for their general association with the concepts of a warning (red), caution (yellow), and all-clear or go (green). The color of the outer periphery 1710 is based upon the performance of the relevant KPI 402 over time. If the KPI 402 is trending downward over a selected time period, the outer periphery 1710 is red. If it is only slightly down, remaining constant, or slightly up, the outer periphery 1710 is yellow. If it is trending upwards, the outer periphery 1710 is green.

The ability to see how many graphical unit 1700 in interface 1800 are red, yellow, and green provides the user with a very quick understanding of performance of these individual KPIs 402. This allows a user to quickly identify problem areas instead of having to digest the numerical values of every metric on the interface 1800. In other words, the conditional formatting colors greatly improve the utility of the graphical unit 1700 as a user interface element.

The metrics are calculated on a trailing twelve-month basis which is the cumulative value of that metric for the last twelve months. This ensures that the peaks and valleys of busier times of the year do not distract from the true performance narrative. This way the organization is always comparing one full year cycle to another full year cycle, instead of comparing a December to a January.

The sparkline 1730 presents numerical data relating to the relevant KPI 402 over a time frame (such as a year) in a graphical manner. Each dot 1722 on the sparkline represents the value for the KPI 402 for a portion of that time period, referred to as a time segment. If the time frame were one year, each time segment could be a month. If the time frame were five years, each time segment might be one year. The actual values for a time segment may be in dollars (or other currencies), a count (such as the number of people), a percentage, or any other numerical value appropriate for that KPI 402. The graphical spark line 1730 typically shows twelve- or thirteen-month dots dot 1722 so as to show a full year's worth of data. Twelve months obviously show an entire year. A thirteen-month sparkline 1730 would show, for example, from June 2023 (technically the value at the end of June 2023) to June 2024 (end of June 2024), which is useful in examining a yearly change for the metric. Each individual dot 1732 on the sparkline 1730 represents a value of the KPI 402 for a particular time segment, and hence can be considered a time segment value. Each of these dots 1732 is color coded to reflect the change for that month versus the previous months. Negative changes have a red dot 1732 (black filled dot in the representation of FIG. 17), neutral changes are yellow (gray-filled), and positive changes have a green dot 1732 (white filled).

In terms of how the colors are selected, one embodiment allows the front-end processor (such as the processor operating on the user device 110) to make a final color selection for individual dots 1732 and the outer periphery. But to limit the overall task submitted to that front-end processor, much work is first accomplished by the server 130, or by the task of defining and configuring the analyzed data 140 and the raw data 150. For example, the server 130 can be responsible for presenting only thirteen months of data to the front-end processor instead of bringing in thousands of data sets. Furthermore, rather than presenting all of the analyzed data 140 and all of the raw data 150 relevant for those months, the server 130 can do some pre-processing to develop and present only data that will be directly presented in the individual month individual dots 1732. If all the relevant data were submitted to the user device 110, it would take a lot of time to perform the necessary computations to present the graphical unit 1700. In this way, the front-end processor need only to compute color formatting for a limited data set. This is accomplished by evaluating growth rate, which happens very quickly when only a limited amount of data for a KPI 402 is presented for display.

Each graphical unit 1700 also shows the current numerical value 1740 for that KPI 402. In FIG. 17, that value 1740 is 132. This may be a count of something, such as lapsing major donors. In FIG. 18, is it seen that the current numerical value 1740 for the KPIs 402 represented by the graphical units 1700 are sometimes raw numbers, sometimes percentages, and sometimes a currency value. While only that final month data value is presented for the current numerical value 1740, in some embodiments the user can hover over any individual dot 1732 in any sparkline 1730 to see actual values for past periods.

Influx Active Outflux

In FIG. 18, a plurality of the graphical units 1700 are presented in an arrangement to show multiple KPIs 402 at once. The arrangement of the KPIs 402 in user interface 1800 divides the graphical units 1700 into groupings or categories, namely the influx category 1810, the active category 1820, and the outflux category 1830. These categories 1810, 1820, 1830 should divide KPIs 402 into a limited number (such as three) groupings that are meaningful for the particular embodiment. The discussion below describes the groupings in the context of the primary example of this disclosure, namely donations to a non-profit. But other embodiments will use different groupings. The KPIs 402 and their respective graphical units 1700 are grouped according to these different categories 1810, 1820, 1830 to form clusters 1802. In FIG. 18, the clusters 1802 are visually distinguished from each other through visual distance—each graphical unit 1700 in the cluster 1802 is closer to another graphical unit 1700 in its cluster 1802 than it is to any of the graphical units 1700 in a different cluster 1802. Other methods for visually distinguishing one cluster 1802 from another are also possible, such as by shading all the graphical units 1700 in each cluster 1802 in a similar manner. The colorization of the outer peripheries 1710 of the graphical units 1700 in these clusters 1802 can show the general trend of an entire category in a glance, without requiring that the user develop an understanding of the titles 1720 or the evaluate the graphical spark line 1730 in the individual graphical units 1700.

The "influx" category 1810 shows KPIs related to targets 200 who are starting to give to the organization. This includes new targets 200 who gave for the first time (they were in the acquisition strategy 410 when they gave their gift), and reactivated targets 200 who gave again after having lapsed from giving for at least 12-months (donors that were in the reactivation strategy 420 when they gave a gift). There are a great number of KPIs 402 that related to the influx targets 200, such as total number of givers in this category 1810, the amount of income generated by these doners, the average gift size, the average increase in giving, etc. These potential KPIs 402 can be further subdivided by segments 620, as described above, which might include major new donors, major reactivated donors, minor new donors, minor reactivated donors, and so on. A subset of these possibilities is selected for presentation, and those portions are shown in their own individual graphical unit 1700 and grouped together under the influx category 1810.

The active category 1820 contains KPIs related to targets 200 who are actively giving to the organization, meaning that they have contributed at least one gift in the trailing twelve months. Some KPIs in this grouping 1820 relate to the entire category, such as the total number of active donors. Additional KPIs 402 that may be relevant in this group 1820 might be broken down by segments 620, which might include:

major targets 200 (have given above a certain amount within a certain time frame), regular targets 200 (have given more than a certain number of times within a certain time frame), multiple targets 200 (have given more than one time but less than would make them a regular donor within a certain time frame), single targets 200 (have only given once within a certain time frame), retained targets 200 (have given in two subsequent time periods, such as last year and this year), and core targets 200 (have given in three subsequent time periods).

Different KPIs (average gift, number of gives, etc.) can be created for each of these segments 620, with a subset chosen for display to be included in interface 1800 as the active grouping 1820.

The outflux category 1830 contains the metrics that report on targets 200 who are at risk of stopping their giving or have already stopped. This includes both lapsing targets 200 (those whose last gift was on a date that is nearing the time that would be considered lapsed, such as thirteen months) and lapsed targets 200 (those whose last give was beyond that time period). As was the case in the other categories 1810, 1820, the KPIs 402 presented in the cluster 1802 can be for the outflux category 1830 as a whole, or for particular segments (major lapsing, major lapsed, regular lapsing, and so on).

Interface 1800 creates clusters 1802 that have separate KPIs 402, but it is not necessarily true that the clusters 1802 related to distinct individual targets 200. For example, specific targets 200 being reported on by a "new donor" KPI 402 (because they have just given their first gift) in the influx category 1810 would also be reported on by an "active donor" KPI 402 (because they have given at least once in the trailing twelve months) in the active category 1820. Furthermore, if the time a new target 200 gave their last gift puts them in the lapsing donor segment, then they are at the same time considered a new, active, and lapsing. This means there would be KPIs 402 associated with that target 200 in all three categories: influx 1810, active 1820, and outflux 1830. Unlike the lifecycle strategies 400, the clusters 1802 in FIG. 18 do not need to track specific donor progression through a life cycle.

As described above, many more KPIs 402 are likely to be available for each clusters 1802 than can be shown in interface 1800. Thus, the interface 1800 only shows subsets of the available KPIs 402. The subsets for each cluster 1802 can be manually selected. In other embodiments, however, the predictive module 142 can be used to select the most important or the most representative KPIs 402 for display. The most important KPIs 402 can be those KPIs 402 that the trained AI algorithm has identified has the strongest correlations with overall success parameters for the entire system 100. The most representative KPIs 402 would be those KPIs 402 that are generally consisted with the overall trend of the KPIs in that cluster 1802.

Filter element 1840 is used to filter the data shown on interface 1800 so that it includes less than all available data. For example, if the organization has multiple geographic regions, the filter element 1840 can be used to limit the data shown to a particular, selected region (or regions). The filter element 1840 can also be used to adjust the time frame for the interface 1800. When a different timeframe is selected, the graphical spark line 1730 in each graphical unit 1700 is altered to reflect the selected timeframe. Thus, while the spark line 1730 generally includes 12-13 months of data, this can be altered through the filter element 1840. If a timeframe of five years were selected, for example, the spark line 1730 would likely show five or six individual dots 1732, each showing the value at the end of a year period. In each case, the spark line 1730 in all of the displayed graphical units 1700 should reflect the same, selected timeframes. The color of the outer periphery 1710 should reflect the overall trend of the KPIs 402 during that timeframe. And the current numerical value 1740 should reflect the ending value of that KPIs 402 for the end of the selected timeframe. In other words, changing the filter element 1840 will change the raw data 150 that is analyzed to create the values for the KPIs 402, which will change the values and sparklines 1730 shown in the interface 1800, but it does not change the number, selection, and arrangement of the graphical units 1700 for these KPIs 402.

Figure 19:
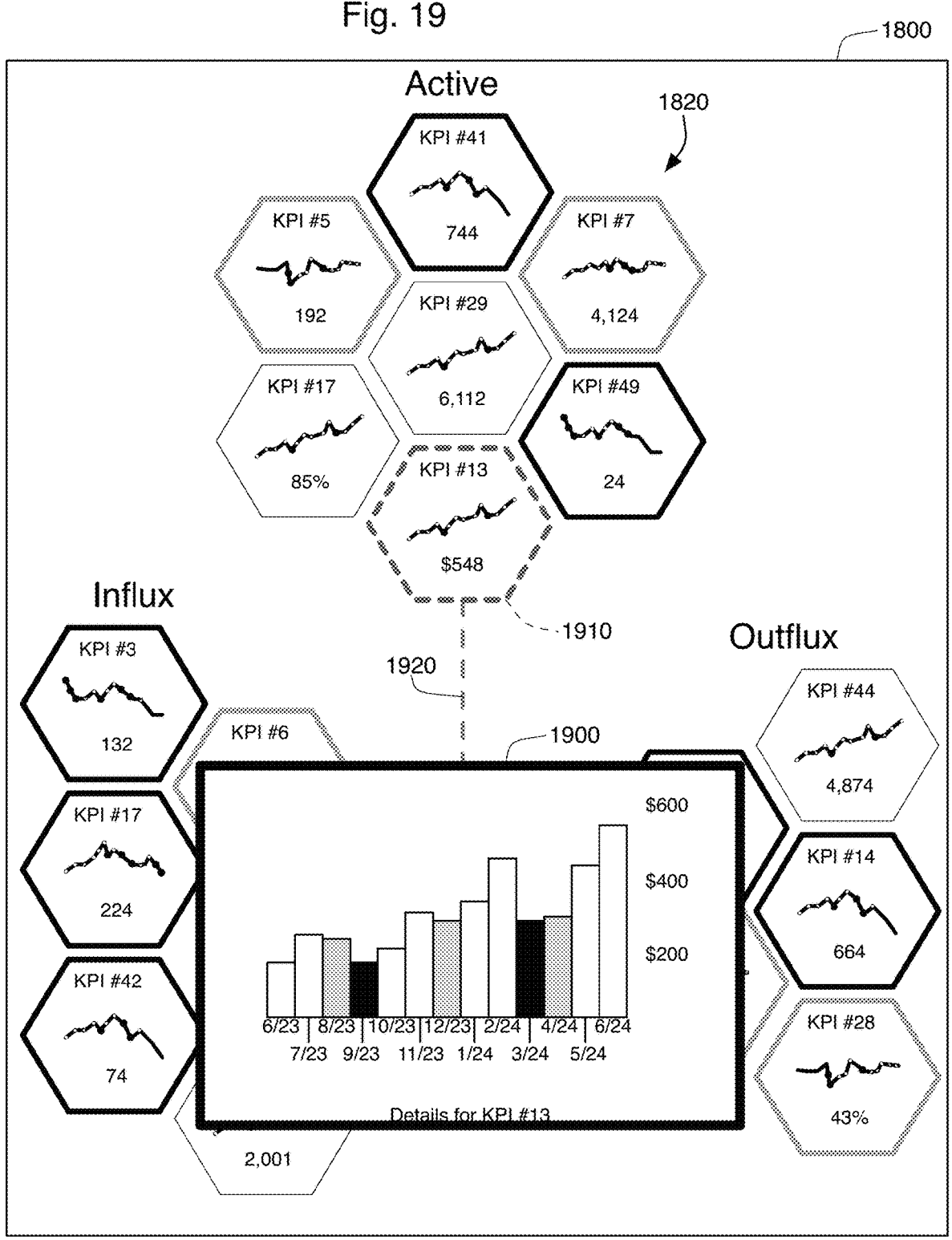
FIG. 19 shows the user interface of FIG. 18 after a detailed window has been opened.

As explained above, when a user hovers over one of the individual dot 1732 in a graphical spark line 1730 in interface 1800, the value for that month for that KPIs 402 is presented. Generally, this occurs in a small window near the cursor. In some embodiments, the user can click one of the graphical units 1700 in interface 1800. When that occurs, a larger window appears, such as detail window 1900 shown in FIG. 19. In this case, the user clicked on graphical unit 1910, related to KPI #13.This is emphasized by a visual change in the appearance of the selected graphical unit 1910. In FIG. 19, this visual change is shown as a dotted outline, but other visual changes such as highlighting, color changes, flashing, etc. could be used to identify the selected graphical unit 1910. The visual change could also include a line, such as line 1920 that connects the detail window 1900 to the selected graphical unit 1910.

The detail window 1900 shows details for the data in the selected graphical unit 1910 for the current timeframe. The data in the detail window 1900 can be the same data shown in the sparkline 1730 for the selected graphical unit 1910, as is the case in FIG. 19. In this case, each monthly value is shown in a bar chart, with each month labeled. The data in this case extends from June 2023 to June 2024. The right side of the bar graph shows a labeled scale for the graph. Each individual month in the detail window 1900 is shown color coded in the same manner as the individual dots 1732 found in the graphical spark line 1730 of the selected graphical unit 1910.

The data for the detail window 1900 for each graphical unit 1700 is sent from the server 130 to the user device 110. In some embodiments, information necessary to create the detail window 1900 for any graphical unit 1700 is submitted as part of the interface 1800 to the user device 110. In order to ensure the data is lightweight, the data is prepared and sent without the keys in each data set. The user device 110 prepares the data for the detail window 1900 by creating an array of periods and computing the proper color formatting. The detail window 1900 can be generated very quickly at the user device 110 by using multiple processing threads to process the data.

Channels

Figure 20:
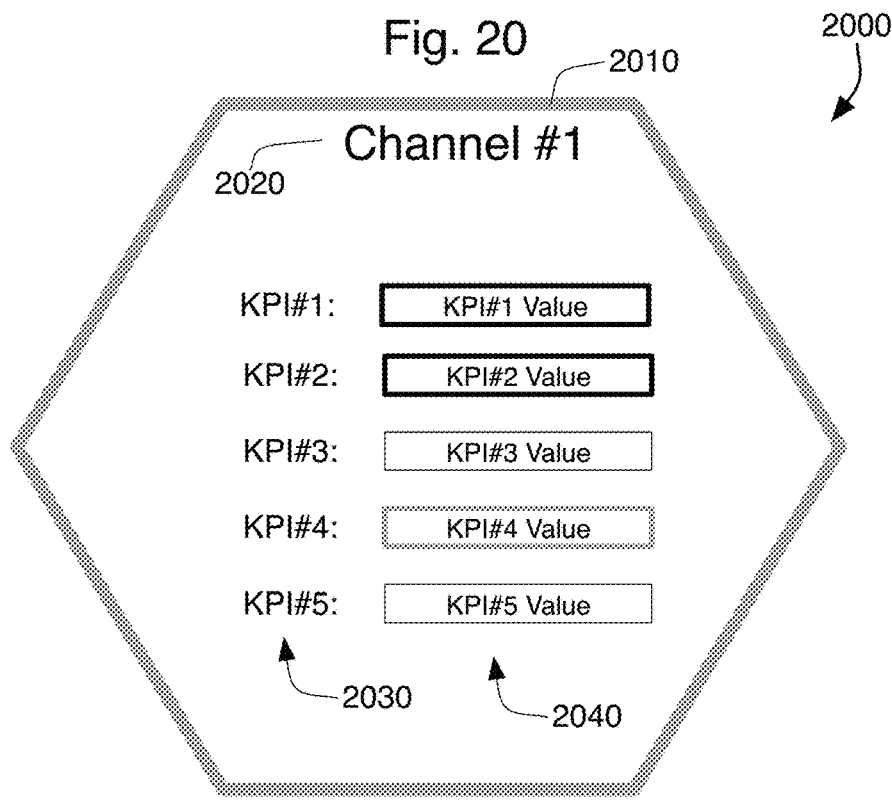
FIG. 20 is a schematic representation of a second embodiment of a graphical unit for a user interface.

FIG. 20 shows another implementation of a graphical unit 2000, this one focused on a particular "channel." In this disclosure, a channel is a particular technique for giving emphasis. In the context of donations to a charitable organization, emphasis is considered to be an advertising or outreach campaign to reach potential, current, or past donors. Channels in this context would be different types of advertising or outreach, such as web-based advertising, telephone outreach, newsletter, television, events, etc. In the context of placing emphasis on employees to enhance productivity and happiness, the channels could take the form of childcare benefits, bonuses, employee outings, etc.

The channel graphical unit 2000 is similar to the KPI-centered graphical unit 1700 shown in FIG. 17, except that the information contained within the channel graphical unit 2000 is focused around a single channel. This channel graphical unit 2000 has an outer periphery 2010 which is again color coordinated to determine whether the values found in the interior of the channel graphical unit 2000 are generally positive (green), neutral (yellow), or negative (red). The channel graphical unit 2000 has a title 2020 that identifies which channel is being described by this channel graphical unit 2000.

Inside the channel graphical unit 2000 are multiple values that relate to the specified channel. In FIG. 20, the channel graphical unit 2000 contains values for five different KPIs 402, with the interior showing the labels or identifiers 2030 for the five KPIs 402 and the values 2040 for those KPIs 402. The values are also color coded to show whether their trend over time is positive (green), neutral (yellow), or negative (red). In FIG. 20, the numerical values 2040 are color coded using a colored outline around the numerical values 2040, but other embodiments would use a colorized font or colorized highlighting as a color indicator. Thus, a quick glance at the colors can identify a trend over time for this channel 2020 for these five KPIs 402.

Figure 21:
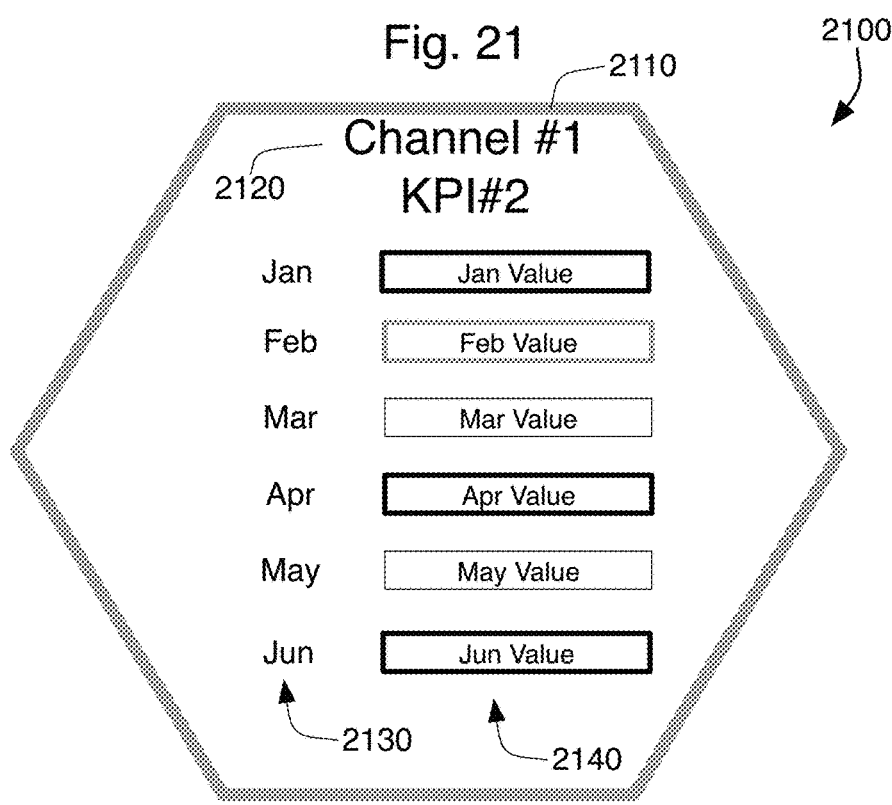
FIG. 21 is a schematic representation of a third embodiment of a graphical unit for a user interface.

FIG. 21 shows another channel graphical unit 2100 that shows detailed information about a channel. This channel graphical unit 2100, however, only shows information about a particular KPI 402 (namely KPI #2). This can be seen in the title 2120 for this channel graphical unit 2100. Instead of containing data about multiple KPIs 402 for this channel, FIG. 21 shows data about different time periods (months, in this case) for this single KPI 402. Thus, there are six month labels 2130 and six month values 2140 in this channel graphical unit 2100, with each month value 2140 being color coded to show the trend for that month (as described above). Note that the individual month values 2140 represent that same data as the dots 1732 on the sparkline 1730 (such as monthly values), so the month values 2140 shown in FIG. 21 can also be considered colorized time segment data. The outer periphery 2110 is again color coded to identify the overall trend of the data contained therein.

Figure 22:
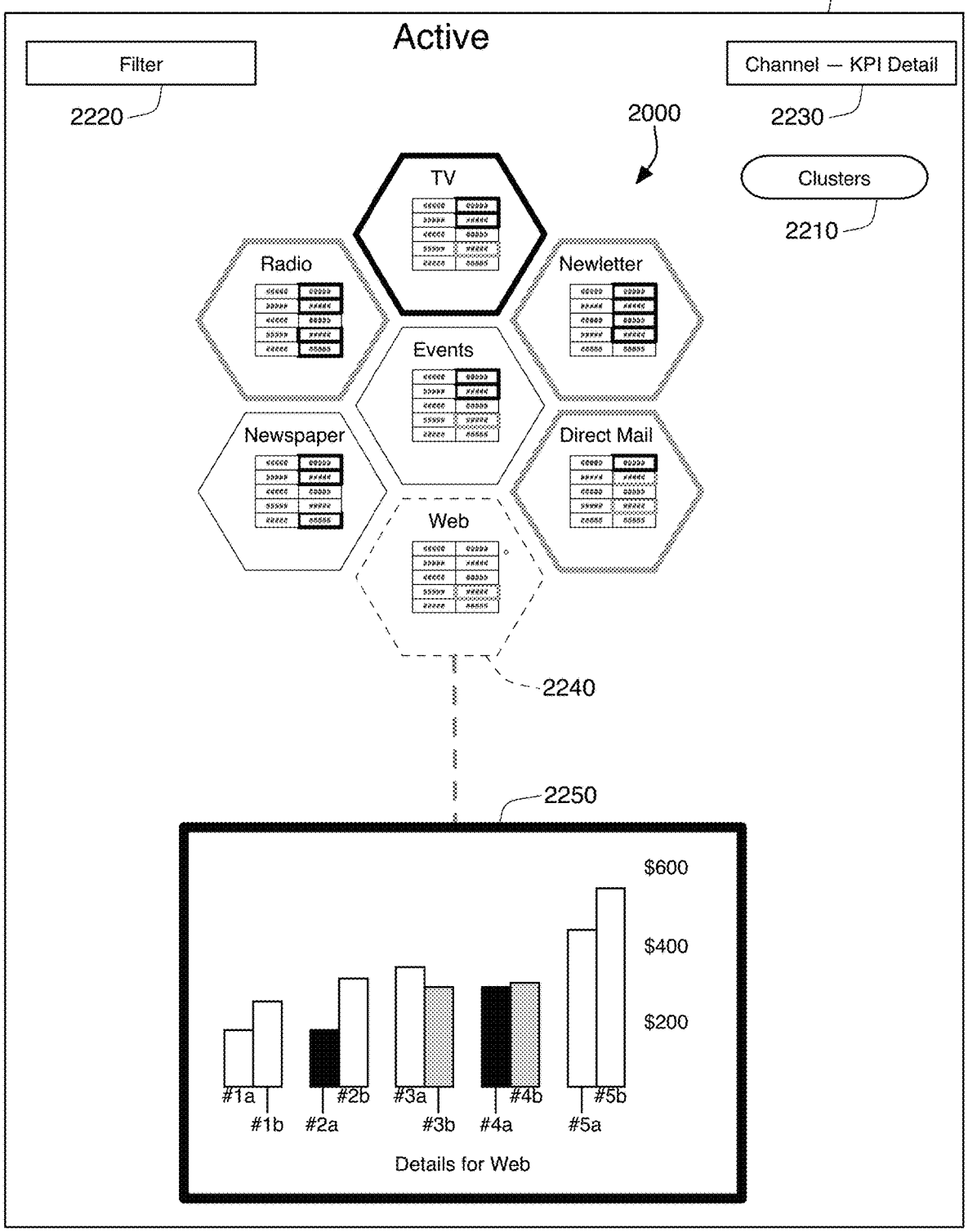
FIG. 22 shows a user interface comprising a plurality of graphical units of FIG. 20.

FIG. 22 shows user interface 2200, in which a plurality of channel graphical units 2000 are shown, each representing a different channel. In this embodiment (although these details are not shown in FIG. 21), the KPIs 402 within each different graphical unit 2000 are identical. Even without reading the individual values 2040 for each KPI 402 in the various graphical units 2000, a user can see which channels are having a downward trend on impact, and which channels are having an upward trend due to the color coding of the outer periphery 2010 of the channel graphical units 2000.

This view enables the user to quickly see performance over all channels. Alternatively, the user can select the filter element 2220 to select only of a subset of data to show in interface 2200. The filter element 2220 may, for example, allow the user to analyze only one type of target 200, with the "type" being dependent on implementation details.

Element 2230 allows the user to select the type of channel graphical unit 2000, 2100. Thus, if the user wishes to replace channel graphical unit 2000 with channel graphical unit 2100 to see trends over time instead of different KPI 402 values, they can easily do so. Of course, the channel graphical unit 2100 is specific to a single KPI 402, so the request to change the to the channel graphical unit 2100 must also include an identification of a specified KPI 402. The same user element 2230 could allow the user to switch to the graphical unit 1700 shown in FIG. 17. If the user then wanted to group by the clusters 1802 (as shown in FIG. 18), the user need only select the Clusters button 2210. Thus, the interface is capable of providing a great deal of information within the various configurations. These different "stories" each have value, and the ability to switch between these stories provides great flexibility.

In some embodiments, the selection interface elements 2210, 2220, 2230 are placed inside a user interface element that is the same size and shape as the displayed graphical units 2000 in order to create a more consistent looking interface. In the example shown in FIG. 22, the three elements 2210, 2220, 2230 could each be placed in their own hexagon, or even all placed within a single hexagon.

If the user wishes to see more detail about any particular channel, the user selects that channel 2240 for a detail view. Similar to what was shown in FIG. 19, a detailed pop-up window 2250 can then be presented to show additional and enlarged details for that channel 2240.

Note that while KPIs 402 and their values were grouped by "channels" in the channel graphical units 2000, 2100, this is not the only technique of grouping together relevant KPIs 402 into a graphical unit. In the above example, the "channel" attribute for the raw data 150 was the "dividing attribute," as data about transactions were divided between different graphical units 2000, 2100 based on their value for this channel attribute. In the charitable donation embodiment, the strategies 400 could be another dividing attribute, with different graphical units 2000, 2100 being defined for acquisition, reactivation, conversion, etc. Each of these values for the dividing attribute could have similar KPIs 402 assigned to them, such as "number of donors," "number of gifts," "average gift," "average value," and "income." Thus, the system 100 may choose between a variety of attributes to serve as the dividing attribute that defines separate graphical units—to effectively serve the role of channels in FIG. 22. Of course, some attributes are calculated based on the value of other data, and the dividing attribute may likewise be defined by a combination or calculation involving other attributes or other, related data. Note that the analysis shown as KPI values 2040 and monthly values 2140 would represent an analysis of all data that shared a common value for the dividing attribute. Thus, the KPI values 2040 inside an "acquisition" graphical unit would reflect the KPI analysis for targets that are considered to fall in the acquisition strategy 410 (and where the relevant transaction data falls within the appropriate time frame).

In some cases, the defined graphical units can also be grouped and divided into the clusters 1802 shown in FIG. 18. Thus, the channel graphical units 2000, 2100 show in the figures are to be taken merely as examples of the KPI groupings that would be possible within a graphical unit.

Using AI to Focus on Critical Success Factors

Figure 23:
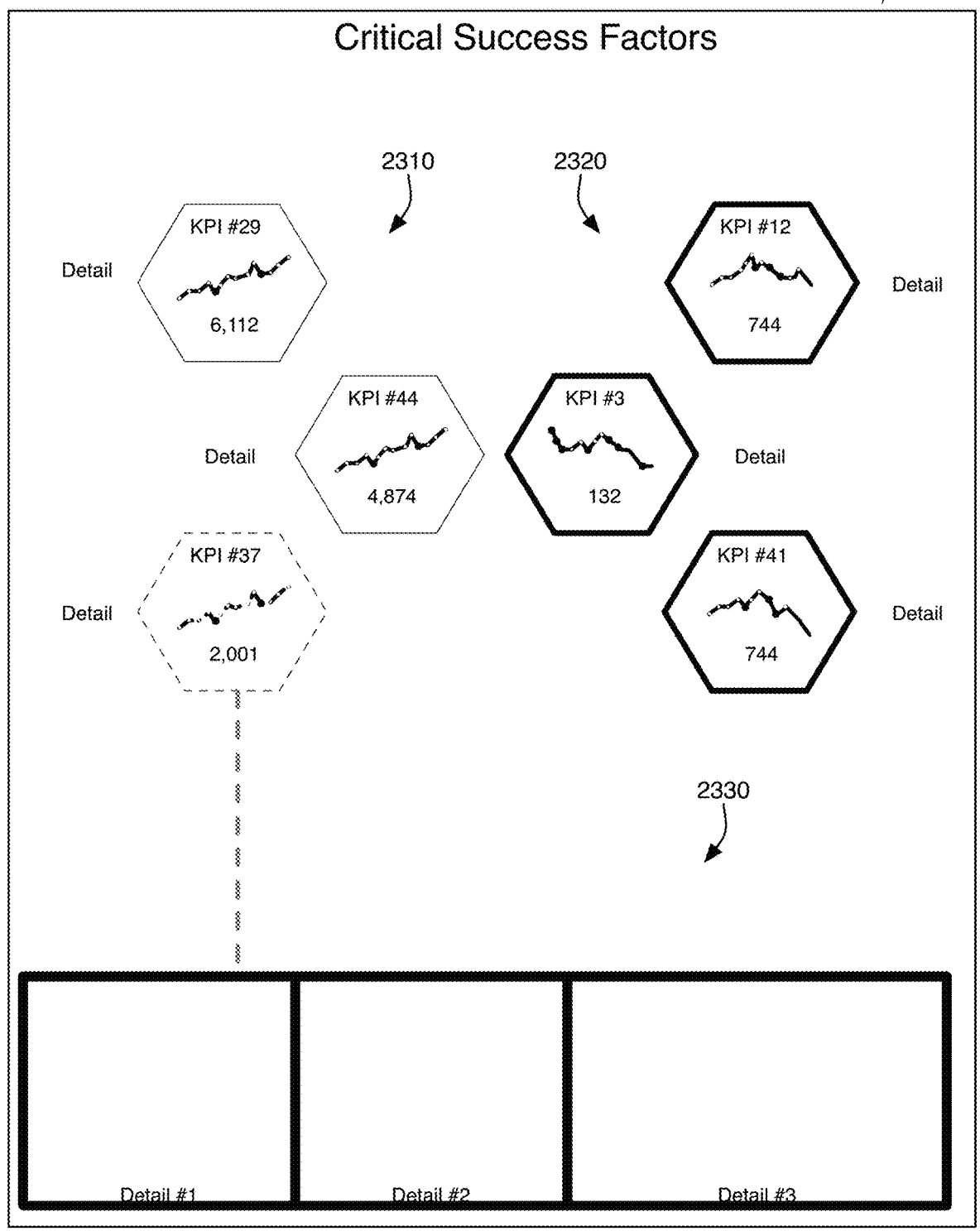
FIG. 23 shows a user interface comprising graphical units selected by an artificial intelligence algorithm.

As described above in connection with interface 1800, only a subset of KPIs may be selected to be shown at any given time. One method for selecting those KPIs can be to select the most important KPIs 402, meaning those KPIs 402 that the trained AI algorithm has identified as having the strongest correlations with overall success parameters for the entire system 100. Interface 2300 shown in FIG. 23 takes this concepts to its natural conclusion by utilizing the AI algorithm to identify an even smaller subset of KPIs 402. In Interface 2300, KPIs were identified that shows the user where the organization is performing the best (through graphical units 2310) and where the organization is performing the worst (through graphical units 2320). The AI algorithm finds the KPIs 402 that have the most impact on financial performance and only chooses from these for this view. In FIG. 23, only the three best 2310 and the three worst 2320 are shown.

This interface 2300 lets the organization quickly and clearly see exactly what they are doing that is improving performance by the greatest margin by examining graphical units 2310. This enables them to know exactly what is working so they can keep doing it. The organization also sees which negative performance indicators are bringing down the financial performance the most by examining graphical units 2320. This enables them to focus on adjusting their strategy in relation to these specific KPIs 402 in order to bring up overall performance. Organizations have limited time and resources, so they are not able to effectively improve every KPI 402 at all times. Through this UI they are able to pinpoint which KPIs that, if they focus on improving them, will bring the financial performance up by the greatest margin.

As can be seen in FIG. 23, detailed views 2330 are provided on the bottom of the interface 2300. The user can choose any of the graphical units 2310, 2320 on the interface 2300 (such as KPI #37), and the detailed views 2330 will update with that data. In one embodiment, the user can select an element in the left-most detailed view 2330, and the remaining detailed views 2330 will update accordingly for that data. These detailed views 2330 are meant to uncover more of the story for the selected KPI 402. Through these detailed views 2330, the user is allowed to segment the chosen KPI 402 into the different channels and regions associated with the organization, so if a KPI 402 is performing poorly the user can diagnose which channel or region is causing the decline.

As explained in more detail above, the AI algorithms utilize deep learning to predict the value for the future time periods. In one embodiment, the AI algorithms minimize the mean square error in order to minimize the error between the predicted and actual values. Seasonality is also recognized so as to be able to predict seasonal variations in the data. At that point, either the actual or the predicted values can be used to arrive at the top three graphical units 2310 and the top and bottom three graphical units 2320 are presented for interface 2300.

Alternative Interface 2500

Figure 24:
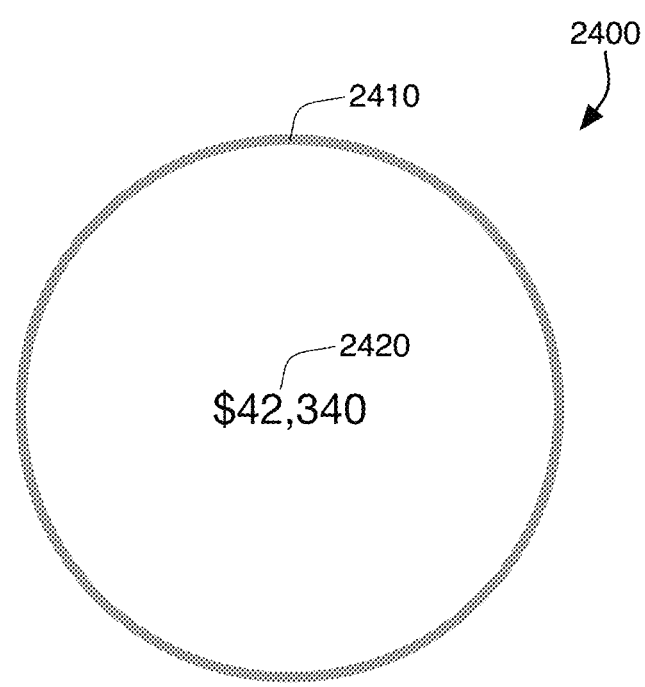
FIG. 24 shows a schematic representation of a fourth embodiment of a graphical unit for a user interface.
Figure 25:
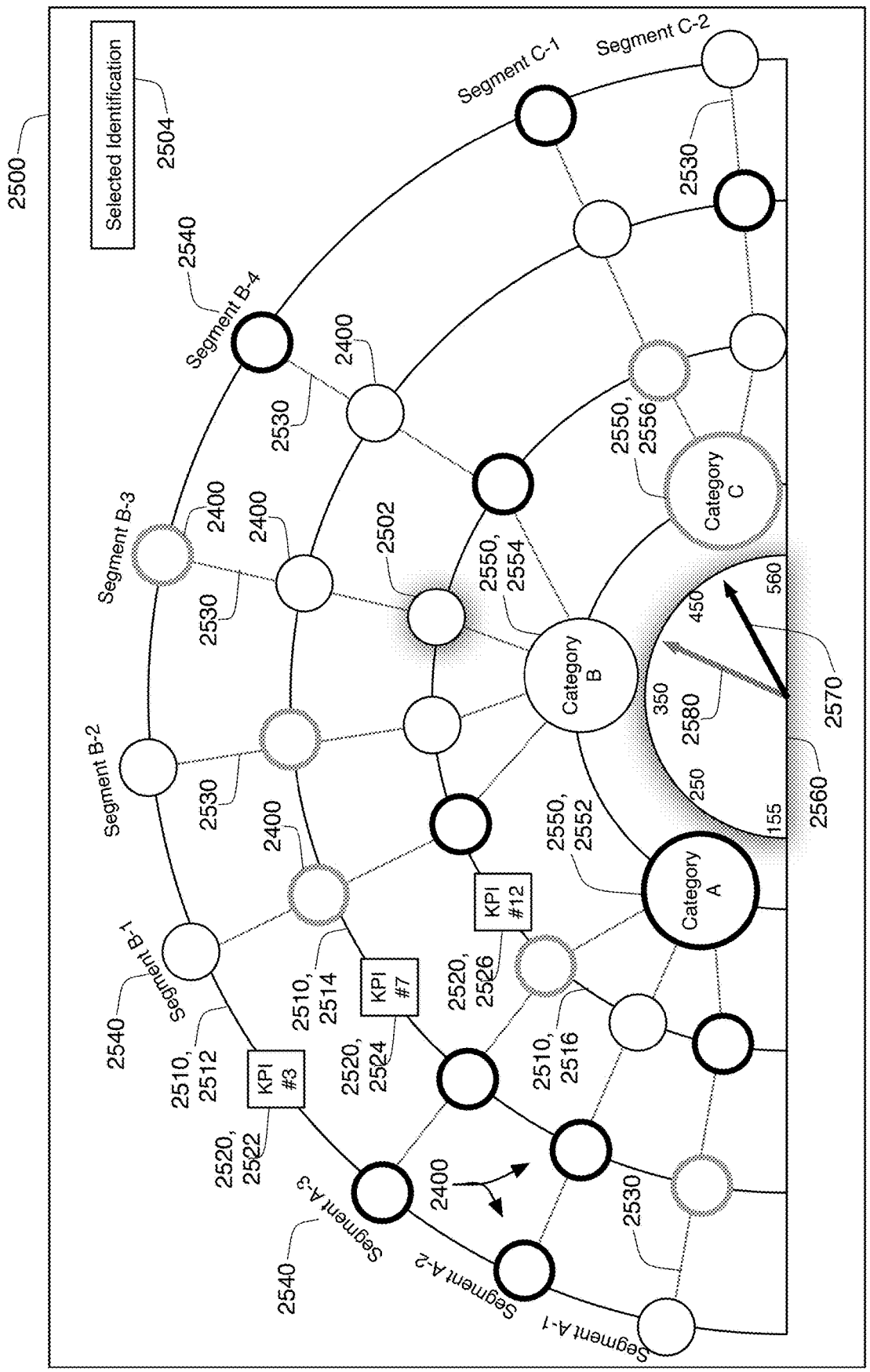
FIG. 25 shows a user interface comprising a plurality of graphical units of FIG. 24.

FIG. 24 shows a circular graphical unit 2400 that can contain information about KPIs 402 in the interfaces used by the system 100. This circular graphical unit 2400 is similar to the other graphical units described above. In particular, it represents data concerning a KPI 402, and it has a periphery 2410 and a numerical value 2420. Also like the other graphical units, the periphery 2410 of the circular graphical unit 2400 is color coded. As was described above, in one embodiment the periphery 2410 is colored red when the trend data for the relevant KPI 402 is negative over a time frame. It is colored yellow when the trend data is neutral. And it is colored green when the trend data is positive. These colors are shown in FIG. 24 and FIG. 25 in the same way as in the earlier figures, with red being a thick black periphery, yellow being a thick gray periphery, and green being a thin black periphery. In FIG. 24, the periphery 2410 is green.

Although the circular graphical unit 2400 shows a numerical value 2420 for the KPI 402, it does not itself contain a label for the KPI 402 (which was shown as title 1720 for the graphical unit 1700 in FIG. 17, for example). This is because the circular graphical unit 2400 is used in interface 2500, shown in FIG. 25, where the identification of the KPI 402 is determined by the location and context of the circular graphical unit 2400.

Interface 2500 arranges a relatively large plurality of circular graphical units 2400 along three, co-centric arcs 2510, namely the outer-most arc 2512, a middle arc 2514, and an inner-most arc 2516. In other embodiments, the interface 2500 could have only two arcs 2510 (just the outer-most arc 2512 and the inner-most arc 2516) or could have more than three arcs 2510 (meaning that there are multiple middle arcs 2514). Each of these arcs 2510 is associated with a label 2520 that is shown proximal to (or on) the arcs 2510, with the outer-most arc 2512 being associated with the KPI #3 label 2522, the middle arc 2514 being associated with the KPI #7 label 2524, and the inner-most arc 2516 being associated with the KPI #12 label 2526.

The circular graphical units 2400 on each arc 2510 will contain the data for a single KPI 402. All circular graphical units 2400 on the outer-most arc 2512 will contain data for KPI #3, as identified by label 2522. Similarly, all circular graphical units 2400 on the middle arc 2514 will contain data for KPI #7, as identified by label 2524, while all circular graphical units 2400 on the inner-most arc 2516 will contain data for KPI #12, as identified by label 2526. However, each separate circular graphical unit 2400 contains the KPI analysis for a different subset of targets 200.

These different subsets are identified by the radial lines 2530 that extend between the outer-most arc 2512 and the inner-most arc 2516 toward the center point of the co-centric arcs 2510. To simplify FIG. 25, not every radial line 2530 shown as part of interface 2500 has a figure label indicating "2530." Proximal to the circular graphical unit 2400 placed on the outer-most arc 2512 at each radial lines 2530 is a segment label 2540. These segment labels 2540 identify a subset of targets 200 for which the KPIs are analyzed to complete the data in the circular graphical unit 2400. The left-most radial lines 2530 has a segment label 2540 indicating that the circular graphical unit 2400 on this radial line 2530 analyzes "Segment A-1" of the targets 200. Meanwhile, the right-most radial lines 2530 on interface 2500 analyzes "Segment C-2" of the targets 200.

With this configuration, the analysis performed by each circular graphical unit 2400 is seen by identifying both the co-centric arcs 2510 and the radial lines 2530 that intersect at that circular graphical unit 2400. For example, selected circular graphical unit 2502 is shown with a shadow in interface 2500, and this selected circular graphical unit 2502 contains data where KPI #12 is analyzed on Segment B-3 of the targets 200.

To use data from the primary example embodiment, the KPIs 402 for each co-centric arcs 2510 could be, for example, total dollars given (instead of KPI #3), total number of gifts (instead of KPI #7), and total number of donors (instead of KPI #12). Segment B-4 could be the segment 620 for Major Active givers (see FIG. 6). Thus, the data found in 2502 would be the total number of donors in the Major Active givers segment 602.

At the center of the co-centric arcs 2510 is a dial interface 2560 that provides detail data about one of the circular graphical units 2400 in the interface 2500. In particular, a user can select one of the circular graphical units 2400 and it will change appearance. In FIG. 25, selected circular graphical unit 2502 is that one. The data in the dial interface 2560 relates, therefore, to this selected circular graphical unit 2502. The dial interface 2560 is provided a scale. In one embodiment, the scale extends from the lowest value for the KPI 402 in the selected circular graphical unit 2502 during a time frame to the highest value. Technically, the scale might only be proximal to the lowest value (perhaps selected by rounding down to a larger significant digit) and proximal to the highest value (rounding up). In FIG. 25, assuming that selected circular graphical unit 2502 relates to the total number of Major Active givers, and the time frame was 12 months, the lowest number of donors was 155 and the highest number was 560.

Two indicators 2570, 2580 are also presented on the dial interface 2560. A current value indicator 2570 shows the current value of the KPI 402 (number of Major Active givers), while an average value indicator 2580 shows the average value during the selected time frame. Interface 2500 also contains a selected identification indicator 2504 which provides a text description of the KPI for the selected circular graphical unit 2502 (such as "Total Number of Major Active Givers").

As explained above, KPIs 402 (such as total dollars given, total number of givers, and total number of donors) can be subdivided by strategies 400 or segments 620. FIG. 25 takes advantage of this to present this unique interface 2500. By removing the need to have title values in the circular graphical unit 2400, more information can be presented to a user in an easier to understand format. The color coding of the periphery 2410 further provides more visual indications as to the current status of the displayed KPIs 402.

FIG. 25 arranges the radial lines 2530 so that multiple radial lines 2530 can be logically combined into summary graphical units 2550. In interface 2500, three summary graphical units 2550 are presented, namely a Category A summary graphical unit 2552, a Category B summary graphical unit 2554, and a Category C summary graphical unit 2556. Three radial lines 2530 visually combined into the Category A summary graphical unit 2552, four radial lines 2530 combine into the Category B summary graphical unit 2554, and two radial lines 2530 combine into the Category C summary graphical unit 2556. This graphical representation effectively groups the circular graphical unit 2400 into separate categories based on the summary graphical units 2550 that are connected to the circular graphical units 2400 through the radial lines 2530. In effect, groupings of radial lines 2530 define the categories, and these radial lines 2530 are visually connected to the summary graphical units 2550.

Note that in FIG. 25 the actual radial lines 2530 do not extend all the way to the center point of the co-centric arcs 2510. These lines 2530 are in fact line segments that extend from the outer-most arc 2512 to the inner-most arc 2516. Nonetheless, these will be referred to as "radial lines" 2530 in this disclosure. Furthermore, the previous paragraph described the radial lines 2530 being visually connected to the summary graphical units 2550. However, the lines connecting to the summary graphical units 2550 are not actually shown touching the radial lines 2530, as FIG. 25 shows a circular graphical unit 2400 at the intersection where they would meet. Nonetheless, this is referred to herein as a connection between these lines as the circular graphical unit 2400 effectively completes this connection. A shown connection between this lines would, of course, be another way to make that connection.

The summary graphical units 2550 are also color coded to represent the overall trend for all circular graphical unit 2400 connected to it through the radial lines 2530. Thus, summary graphical unit 2552 is colored red (thick black circumference), indicating negative trends for this category. Category B summary graphical unit 2554 is colored green, indicating a positive trend, while Category C summary graphical unit 2556 is colored yellow because of a neutral trend. These summary graphical units 2550 provide even more easily visible clues to the total amount of data provided by the numerous circular graphical units 2400 in interface 2500.

In one embodiments, the summary graphical units 2550 represent strategies 400, using the same correlation between segments 620 and strategies 400 described above. In other embodiments, the summary graphical units 2550 are similar to the clusters 1802 described above in connection with FIG. 18. The interface 2500 is flexible enough to be used in a variety of contexts.

Furthermore, in other embodiments, not all intersections between the co-centric arcs 2510 and the radial lines 2530 need to contain a circular graphical unit 2400. This absence would occur when a KPI 402 indicated by a label 2520 for one of the co-centric arcs 2510 is inapplicable to one of segments indicated by the segment label 2540.

Figure 26:
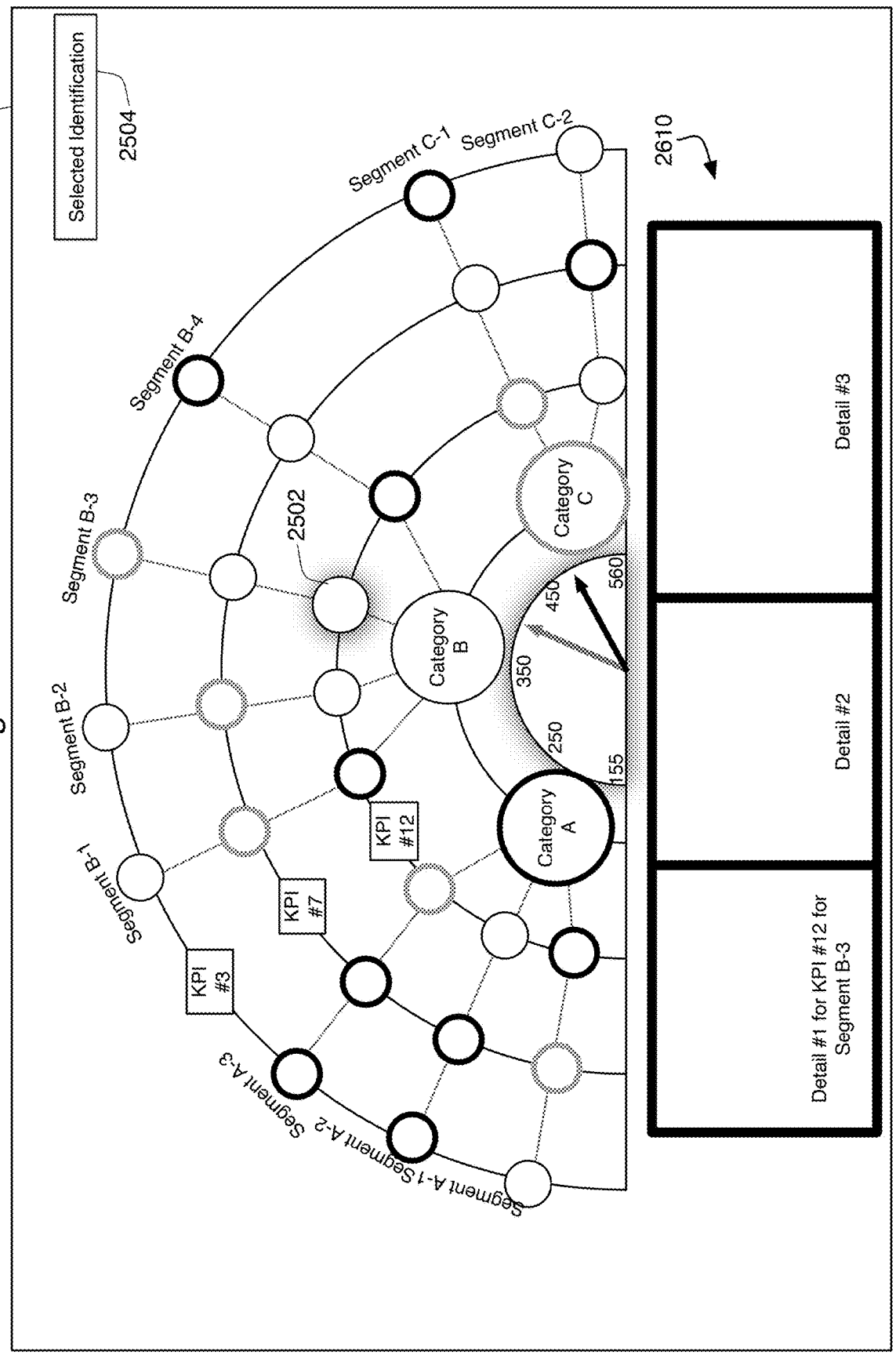
FIG. 26 shows an alternative user interface comprising a plurality of graphical units of FIG. 24.

Finally, drill through detail interface might be presented for the selected circular graphical unit 2502, as shown in interface 2600 in FIG. 26. In interface, the same selected circular graphical unit 2502 has been chosen as in FIG. 25, and the selected identification indicator 2504 still provides an identification for this. Now, when the system 100 received the selection of selected identification indicator 2504, it also presents the drill through windows 2610 in addition to the dial interface 2560 for this KPI 402. The details of the drill through windows 2610 are relatively unimportant, but the Detail #1 window could look like the bar chart shown at detail window 1900 in FIG. 9. From this left-most window, the user can elect to drill down, such as by selecting a single bar on the bar chart. The other windows will then provide more information about the selection. In some embodiments, the selection relates to a time segment (such as a selected month), but in other embodiments a user can drill down to a selected channel, or even to a different but related KPI 402.

There is a drill on the bottom of the screen that enables the user to drill down into the metrics and find specific answers about performance. The user can choose any of the circles on the page and the drill will update with that data. Then the user can click a specific bar in the first graph, and the rest of the drill will update accordingly for that data. These drill charts are meant to uncover more of the story for a metric. They segment the chosen metric into the different channels and regions associated with the organization, so if a metric is performing poorly the user can diagnose which channel or region is causing the decline.

Figure 27:
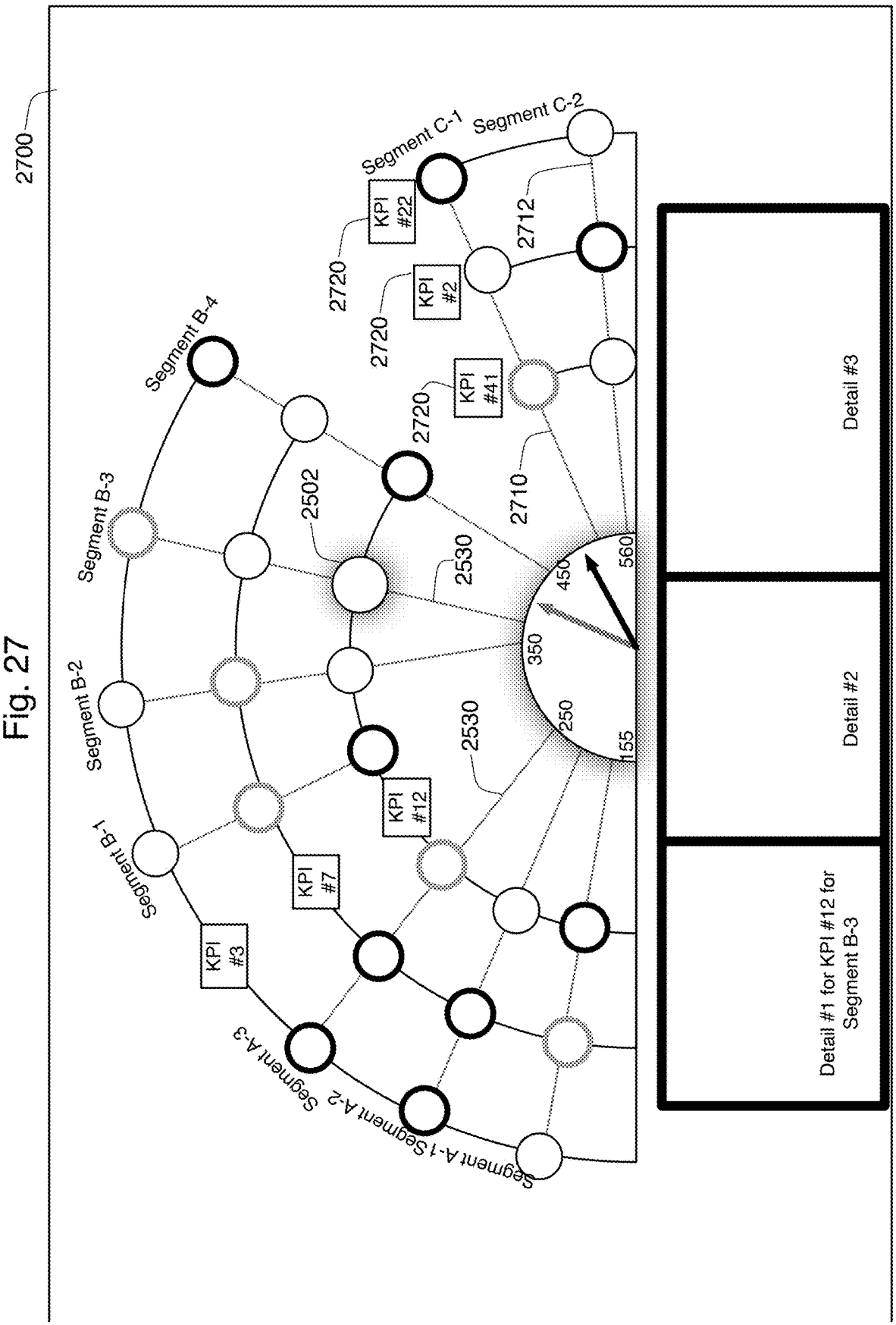
FIG. 27 shows a second alternative user interface comprising a plurality of graphical units of FIG. 24.

In some embodiments, the labels 2520 relate only to a subset of the categories shown in interface 2500. For example, the three labels 2520 shown in FIG. 25 might only relate to categories A and B but might not relate to category C. To visually indicate this distinction, the co-centric arcs 2510 might have a gap between category B and C, and new labels 2520 could be added to the interface 2500 for the co-centric arcs 2510 in category C. This can be seen in interface 2700, as shown in FIG. 27. In this interface, no summary graphical units 2550 are shown, but the radial lines 2530 are still grouped together into categories. Radial lines 2710, 2712 are non-connecting, as they no longer relate to the same KPIs 402 as the other radial lines 2530. Thus, new KPI labels 2720 are shown for the circular graphical unit 2400 on these radial lines 2710, 2712.

One benefit of the embodiments shown in FIGS. 25-27 is that the utilization of arcs 2510 and radial lines 2530 means that titles or other descriptors are not required in the circular graphical unit 2400. However, it is also possible to use the arrangement of FIGS. 25-27 with different graphical units, such as graphical unit 1700 shown in FIG. 17. When used in the arrangements of FIGS. 25-27, there would be no need to provide a title 1720 within the graphical unit 1700. Otherwise, additional details about the trend such as a graphical spark line 1730 could be included in these arrangements.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method of generating an improved user interface comprising:
    a) accessing raw data associated with targets, the raw data including target data elements associated with associated data, the associated data comprising attribute data and transactions;
    b) identifying key performance indicators (KPIs) for the raw data, wherein the KPIs comprise results of a mathematical analysis of the raw data;
    c) identifying segments, each segment being associated with a subset of the target data elements based on the associated data;
    d) identifying for display a first KPI, a second KPI, and a third KPI;
    e) calculating, for each segment, a current value for the first KPI, the second KPI, and the third KPI;
    f) presenting the improved user interface, wherein:
        i) three arcs are displayed each associated with a KPI, wherein an inner-most arc associated with the first KPI is displayed, a middle arc associated with the second KPI is displayed, and an outer-most arc associated with the third KPI is displayed,
        ii) a plurality of radial lines is displayed, wherein each of the plurality of radial lines is associated with a segment,
        iii) intersections are formed where an intersecting arc intersects with an intersecting radial line, and
        iv) graphical units are displayed at the intersections, wherein each graphical unit shows information about a current value corresponding to an associated KPI associated with the intersecting arc calculated for an associated segment associated with the intersecting radial line;
    g) receiving a selection of a selected graphical unit through the improved user interface, the selected graphical unit containing a selected current value corresponding to a selected KPI and a selected segment; and
    h) presenting a detail data interface showing an indicated value associated with the selected current value.

2. The method of claim 1, further comprising, for each graphical unit, calculating a trend over a time frame for the associated KPI and the associated segment; wherein the graphical units each comprise a periphery that is color coded in a color associated with the trend.

3. The method of claim 2, wherein the detail data interface is a dial interface having a scale and a current value indicator pointing to a position on the scale for the indicated value.

4. The method of claim 3, wherein the trend for the selected graphical unit comprises a lowest value and a highest value over the time frame, further wherein the scale ranges from proximal the lowest value to proximal the highest value.

5. The method of claim 4, further comprising presenting a detailed view through the improved user interface showing additional data concerning the selected KPI and the selected segment.

6. The method of claim 1, wherein the improved user interface further comprises a segment label proximal to each of the plurality of radial lines and a KPI label proximal to each arc.

7. The method of claim 1, wherein the plurality of radial lines are grouped into a plurality of categories, wherein the radial lines in each category are connected to a summary graphical unit, wherein each summary graphical unit contains a summary value derived from the associated KPIs and the associated segments of the graphical units on the intersections on the radial lines connected to the summary graphical unit.

8. The method of claim 1, wherein the improved user interface further comprises a fourth arc between the outer-most arc and the middle arc, the fourth arc also having additional intersections with the radial lines and having additional graphical units displayed at the additional intersections on the fourth arc.

9. The method of claim 1, wherein no graphical units are displayed at a subset of the intersections.

10. The method of claim 1, wherein the improved user interface further comprises non-connecting radial lines that do not intersect with the three arcs, wherein additional graphical units are displayed on the non-connecting radial lines showing values that do not relate to any of the first KPI, the second KPI, and the third KPI.

11. The method of claim 1, wherein the graphical units are circular.

12. A method of generating an improved user interface comprising:
   a) accessing raw data associated with targets, the raw data including target data elements associated with associated data, the associated data comprising attribute data and transactions;
   b) identifying key performance indicators (KPIs) for the raw data, wherein the KPIs comprise results of a mathematical analysis of the raw data;
   c) identifying segments, each segment being associated with a subset of the target data elements based on the associated data;
   d) identifying for display a first KPI and a second KPI;
   e) calculating, for each segment, a current value for the first KPI and the second KPI; and
   f) presenting the improved user interface, wherein:
      i) two arcs are displayed each associated with a KPI, wherein an inner-most arc associated with the first KPI is displayed, and an outer-most arc associated with the second KPI is displayed,
      ii) a plurality of radial lines is displayed, wherein each of the plurality of radial lines is associated with a segment,
      iii) intersections are formed where an intersecting arc intersects with an intersecting radial line,
      iv) graphical units are displayed at the intersections, wherein each graphical unit shows a current value corresponding to an associated KPI associated with the intersecting arc calculated for an associated segment associated with the intersecting radial line,
      v) for each graphical unit, a trend is calculated over a time frame for the associated KPI and the associated segment, and
      vi) the graphical units each comprise a periphery that is color coded in a color associated with the trend;
   g) receiving a selection of a selected graphical unit through the improved user interface, the selected graphical unit containing a selected current value corresponding to a selected KPI and a selected segment; and
   h) presenting a detail data interface showing an indicated value associated with the selected current value.

13. The method of claim 12, further comprising:
   wherein the detail data interface is a dial interface having a scale and a current value indicator pointing to a position on the scale for the indicated value.

14. The method of claim 13, wherein the trend for the selected graphical unit comprises a low value and a high value over the time frame, further wherein the scale ranges to the low value to the high value.

15. The method of claim 12, wherein the improved user interface further comprises a segment label proximal to each of the plurality of radial lines and a KPI label proximal to each arc.

16. The method of claim 12, wherein the radial lines are grouped into a plurality of categories, wherein the radial lines in each category are connected to a summary graphical unit, wherein each summary graphical unit contains a summary value derived from the associated KPIs and the associated segments of the graphical units on the intersections on the radial lines connected to the summary graphical unit.

17. The method of claim 12, wherein graphical units are not displayed at all intersections.

18. The method of claim 12, wherein the improved user interface further comprises non-connecting radial lines that do not intersect with the two arcs, wherein additional graphical units are displayed on the non-connecting radial lines showing values that do not related to any of the first KPI and the second KPI.

19. A system comprising:
   a server having a processor operating under programming instructions stored in memory, the programming instructions directing the processor to:
      a) access raw data associated with targets, the raw data including target data elements associated with associated data, the associated data comprising attribute data and transactions;
      b) identify key performance indicators (KPIs) for the raw data, wherein the KPIs comprise results of a mathematical analysis of the raw data;
      c) identify segments, each segment being associated with a subset of the target data elements based on the associated data;
      d) identify for display a first KPI and a second KPI;
      e) calculate, for each segment, a current value for the first KPI and the second KPI; and
      f) presenting a user interface, wherein:
         i) two arcs are displayed each associated with a KPI, wherein an inner-most arc associated with the first KPI is displayed, and an outer-most arc associated with the second KPI is displayed,
         ii) a plurality of radial lines is displayed, wherein each of the plurality of radial lines is associated with a segment,
         iii) intersections are formed where an intersecting arc intersects with an intersecting radial line,
         iv) graphical units are displayed at the intersections, wherein each graphical unit shows data corresponding to an associated KPI associated with the intersecting arc calculated for an associated segment associated with the intersecting radial line,
         v) for each graphical unit, a trend is calculated over multiple time segments over a time frame for the associated KPI and the associated segment,
         vi) within each graphical unit is time segment data for the associated KPI and the associated segment, and
         vii) the graphical units each comprise a periphery that is color coded in a color associated with the trend;

g) receive a selection of a selected graphical unit through the user interface, the selected graphical unit containing a selected current value corresponding to a selected KPI and a selected segment; and
h) present a detail data interface showing an indicated value associated h) with the selected current value.

20. The system of claim 19, wherein the time segment data is a sparkline.

21. A method of generating an improved user interface comprising:
a) accessing raw data associated with targets, the raw data including target data elements associated with associated data, the associated data comprising attribute data and transactions;
b) identifying key performance indicators (KPIs) for the raw data, wherein the KPIs comprise results of a mathematical analysis of the raw data;
c) identifying segments, each segment being associated with a subset of the target data elements based on the associated data;
d) identifying for display a first KPI, a second KPI, and a third KPI;
e) calculating, for each segment, a current value for the first KPI, the second KPI, and the third KPI;
f) presenting the improved user interface, wherein:
  i) KPI lines are displayed each associated with a different KPI, wherein a first KPI line associated with the first KPI is displayed, a second KPI line associated with the second KPI is displayed, and third KPI line associated with the third KPI is displayed,
  ii) a plurality of segment lines is displayed, wherein each of the plurality of segment lines is associated with a segment,
  iii) intersections are formed where an intersecting KPI line intersects with an intersecting segment line, and
  iv) graphical units are displayed at the intersections, wherein each graphical unit shows information about a current value corresponding to an associated KPI associated with the intersecting KPI line calculated for an associated segment associated with the intersecting segment line;
g) receiving a selection of a selected graphical unit through the improved user interface, the selected graphical unit containing a selected current value corresponding to a selected KPI and a selected segment;
h) after receiving the selection of the selected graphical unit, altering an appearance for the selected graphical unit;
i) presenting an identification indicator that provides a text description of the selected KPI for the selected graphical unit; and
j) presenting a detail data interface showing an indicated value associated with the selected current value.

22. The method of claim 21, further comprising, for each graphical unit, calculating a trend over a time frame for the associated KPI and the associated segment; wherein the graphical units each comprise a periphery that is color coded in a color associated with the trend.

23. The method of claim 22, further comprising presenting a first drill through window in addition to the detail data interface after receiving the selection of the selected graphical unit, wherein the first drill through window contains additional details concerning the selected graphical unit, wherein the first drill through window comprises selectable elements, and further wherein the selection of a particular selectable element generates a second drill through window providing additional details on the particular selectable element.

* * * * *